(12) United States Patent
Naoi

(10) Patent No.: US 8,480,164 B2
(45) Date of Patent: Jul. 9, 2013

(54) FRONTAL STRUCTURE OF VEHICLE

(75) Inventor: Daisuke Naoi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 199 days.

(21) Appl. No.: 13/175,412

(22) Filed: Jul. 1, 2011

(65) Prior Publication Data

US 2012/0001455 A1 Jan. 5, 2012

(30) Foreign Application Priority Data

Jul. 2, 2010 (JP) ................................. 2010-152379
Jul. 2, 2010 (JP) ................................. 2010-152381
Jul. 2, 2010 (JP) ................................. 2010-152383

(51) Int. Cl.
*B60J 7/00* (2006.01)

(52) U.S. Cl.
USPC .................................................... 296/193.09

(58) Field of Classification Search
USPC ............... 296/193.09, 187.09, 203.02, 37.12, 296/70, 146.7, 193.02, 24.34; 180/90
See application file for complete search history.

(56) References Cited

U.S. PATENT DOCUMENTS

| | | | | |
|---|---|---|---|---|
| 5,620,366 A | * | 4/1997 | Munzel et al. | 454/152 |
| 5,676,216 A | * | 10/1997 | Palma et al. | 180/90 |
| 6,213,504 B1 | * | 4/2001 | Isano et al. | 280/748 |
| 6,371,551 B1 | * | 4/2002 | Hedderly | 296/192 |
| 6,601,909 B2 | * | 8/2003 | Obara et al. | 296/191 |
| 8,276,978 B2 | * | 10/2012 | Stachura et al. | 296/191 |
| 8,388,048 B2 | * | 3/2013 | Usuda | 296/203.02 |
| 2012/0001453 A1 | * | 1/2012 | Naoi | 296/190.08 |
| 2012/0001456 A1 | * | 1/2012 | Naoi | 296/193.09 |
| 2012/0212009 A1 | * | 8/2012 | Ishizono et al. | 296/193.07 |

FOREIGN PATENT DOCUMENTS

| | | |
|---|---|---|
| JP | 59-126776 U | 8/1984 |
| JP | 62-207587 | 9/1987 |
| JP | 63-82678 U | 5/1988 |
| JP | 02-66374 U | 5/1990 |
| JP | 03-051684 U | 5/1991 |
| JP | 05-065079 | 3/1993 |
| JP | 07-309253 | 11/1995 |
| JP | 08-175429 | 7/1996 |
| JP | 10-109666 | 4/1998 |
| JP | 2000-177637 | 6/2000 |
| JP | 2002-274291 | 9/2002 |
| JP | 2004-114922 | 4/2004 |
| JP | 2005-319941 | 11/2005 |
| JP | 2005-324777 | 11/2005 |
| JP | 2006-151104 | 6/2006 |
| JP | 2006-193086 | 7/2006 |
| JP | 2006-218965 | 8/2006 |

OTHER PUBLICATIONS

Japanese Office Action, Application No. 2010-152379, mailed Apr. 17, 2012, six pages.
Japanese Office Action, Application No. 2010-152381, mailed Apr. 17, 2012, six pages.

(Continued)

*Primary Examiner* — Kiran B Patel
(74) *Attorney, Agent, or Firm* — Rankin, Hill & Clark LLP

(57) ABSTRACT

A frontal structure of a vehicle includes: a dashboard lower section; and a damping panel connecting to the dashboard lower section, wherein the dashboard lower section includes an upper rim flange and a front wall including a bending shape; and the damping panel includes a bead curved more gradually compared to the bending shape.

15 Claims, 21 Drawing Sheets

OTHER PUBLICATIONS

Japanese Office Action, Application No. 2010-152383, mailed Apr. 24, 2012, six pages.

Japanese Notice of Allowance, Application No. 2010-152379, Mailed Dec. 21, 2012, with English Translation.

* cited by examiner

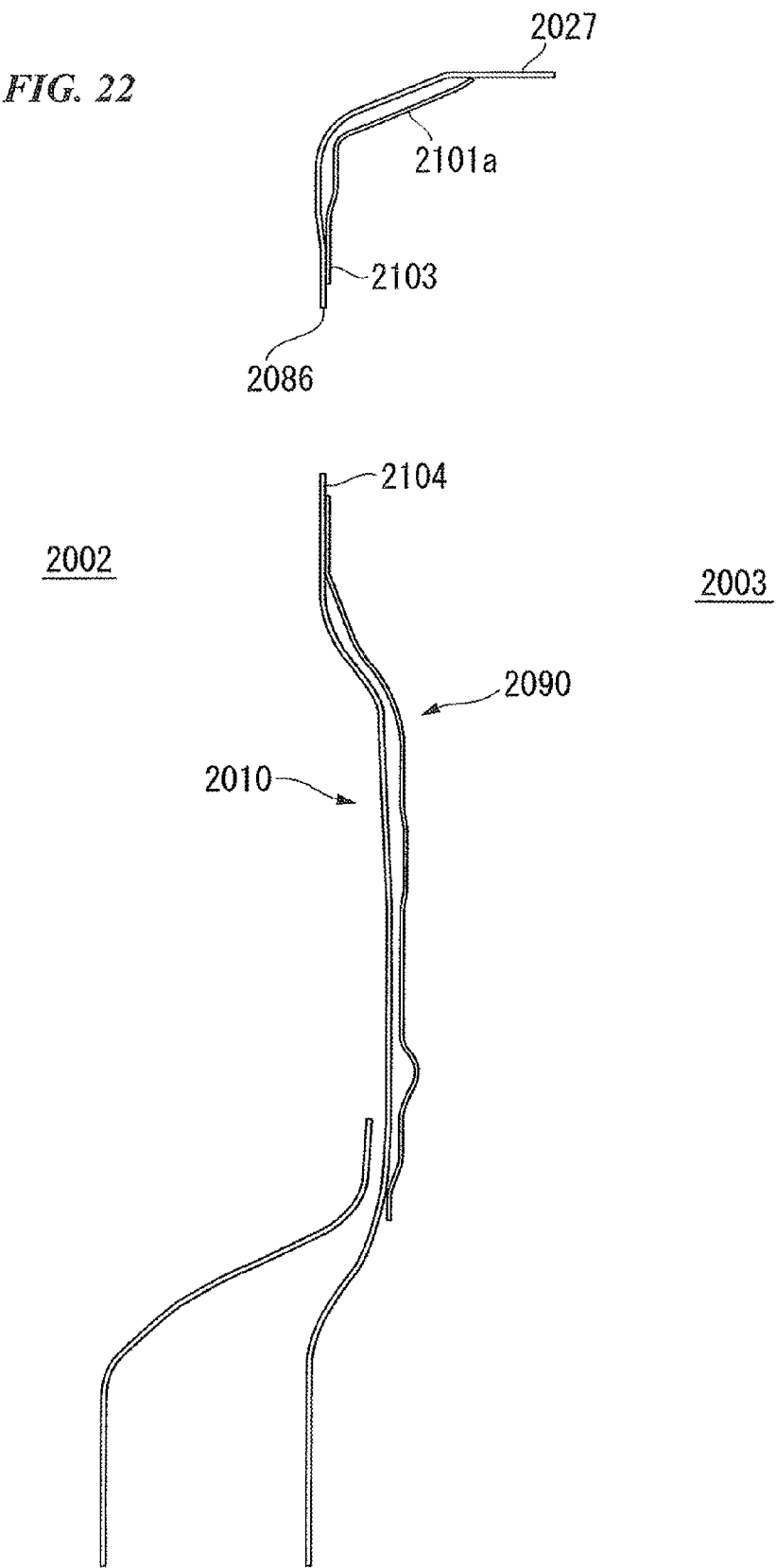

FRONTAL STRUCTURE OF VEHICLE

Priority is claimed on Japanese Patent Application No. 2010-152379, filed Jul. 2, 2010; Japanese Patent Application No. 2010-152381, filed Jul. 2, 2010; Japanese Patent Application No. 2010-152383, filed Jul. 2, 2010; the contents of which are incorporated herein by reference.

TECHNICAL FIELD

The present invention relates to a frontal structure of a vehicle.

BACKGROUND ART

An instrument panel is provided at a front side inside a cabin (vehicle chamber) of a vehicle in a vehicle width direction. An air conditioning unit and the like is embedded in the instrument panel. The air conditioning unit is a cooling cycle equipment including a compression device, an evaporator, a condenser, an air conditioning piping, a blower, and the like. The air conditioning piping connects the compression device, the evaporator, and the condenser. The air conditioning piping and the like are placed between an engine room and the cabin. Therefore, a penetration hole is formed on a dashboard lower section (a dashboard lower panel) dividing the engine room and the cabin. The air conditioning piping passes through the penetration hole.

Here, an air conditioning boot (a seal boot) is provided on the dashboard lower section. The air conditioning boot prevents rain and dust from entering the cabin side from the penetration hole. The air conditioning boot includes a boot part and an annular fitting groove. The boot part is approximately cylindrically shaped. The boot part is formed so as to surround a peripheral of the penetration hole. The annular fitting groove is provided at an end of the boot part and is fitted and fixed to an interior of the penetration hole. Furthermore, the air conditioning piping is arranged inside the air conditioning boot. (See, for example, Japanese Unexamined Patent Application, First Publication No. 2004-114922.)

Incidentally, when the air conditioning boot is provided on the dashboard lower section, the vibration of the engine and noise from the roads will be transmitted to the dashboard lower section via the air conditioning boot. The dashboard lower section merely separates the engine room from the cabin. Therefore, the dashboard lower section is often formed with a thin plate in order to reduce the weight of the dashboard lower section. As a result, there is a problem in that the dashboard lower section undergoes a membrane vibration. There is also a problem in that an NV characteristic of the air conditioning wiring declines.

The present invention is made according to the considerations described above. The present invention provides a frontal structure of a vehicle which prevents the dashboard lower section from undergoing a membrane vibration, and also enhances an NV characteristic of the air conditioning wiring.

In addition, generally speaking, a damping material (a sound insulator) is attached to a dashboard lower section (a dashboard lower panel) separating an engine room from a cabin (a vehicle chamber). The damping material reduces the influence of noise inside the engine room and vibration to the cabin chamber. A so-called melting sheet is used as the damping material, for example. The melting sheet, such as an asphalt sheet and the like, has viscosity and elasticity. (See, for example, Japanese Unexamined Patent Application, First Publication No. H7-309253.)

For instance, the damping material may be fixed by using a plate that presses the damping material. The damping material is sandwiched between the plate and the dashboard lower section. Under this condition, the plate is fixed to the dashboard lower section by spot-welding.

By the way, according to the conventional technology described above, it is necessary to thicken the damping material and the plate material in order to prevent the dashboard lower section, the damping material, and the plate pressing the damping material from undergoing a membrane vibration. As a result, the cost of the materials used to manufacture the damping material and the plate pressing the damping material increases. At the same time, there is also a problem in that the weight increases.

The present invention is made according to the considerations described above. The present invention provides a frontal structure of a vehicle which can reduce the cost of materials and the weight.

In addition, generally speaking, a damping material (a sound insulator) is attached to a dashboard lower section (a dashboard lower panel) separating an engine room from a cabin (a vehicle chamber). The damping material reduces the influence of noise inside the engine room and vibration to the cabin chamber. A so-called melting sheet is used as the damping material, for example. The melting sheet, such as an asphalt sheet and the like, has viscosity and elasticity. A reinforcing plate is provided to attach the damping material to the dashboard lower section. The damping material is sandwiched between the reinforcing plate and the dashboard lower section. Under this condition, the reinforcing plate is fixed to the dashboard lower section by spot-welding.

Here, when the damping material is attached to the dashboard lower section, a gravitational force applies to the damping material. As a result, the damping material may decline. Accordingly, various technology is suggested to prevent the damping material from slipping.

For example, an elevated portion is formed at an appropriate place of the reinforcing plate at which an attachment is made to the dashboard lower section. The elevated portion is formed by making the reinforcing plate concaved towards the dashboard lower section side. The elevated portion bulges towards an interior of a closed cross section. An opening hole is provided at a peak part of the elevated portion. A flange part is formed in the periphery of the elevated portion. The tip end of the flange part approaches the dashboard lower section. In this way, a locating portion of the damping material is formed. (See, for example, Japanese Unexamined Patent Application, First Publication No. H7-309253.) According to this technology, the damping material latches with the elevated portion, which forms the locating portion. The damping material also latches with the flange part around the rim of the opening hole. As a result, the damping material is prevented from dislocating.

However, according to the conventional technology described above, the opening hole is provided merely to prevent the damping material from dislocating. Therefore, when the reinforcing plate is fixed to the dashboard lower section so as to sandwich the damping material in between, it is difficult to determine from the outside whether or not the damping material exists. As a result, there is a problem in that one may forget to place the damping material. There is also a problem in that the operation of determining whether or not the damping material has slipped becomes burdensome.

The present invention is made according to the considerations described above. The present invention provides a frontal structure of a vehicle which prevents the damping material from being forgotten to be attached. The present invention also provides a frontal structure of a vehicle which allows one to easily determine whether or not the damping material has slipped.

DISCLOSURE OF INVENTION

In order to solve the above problem, a frontal structure of a vehicle employs the following configuration:

(1) A frontal structure of a vehicle according to an aspect of the present invention includes: a dashboard lower section; and a damping panel connecting to the dashboard lower section, wherein the dashboard lower section includes an upper rim flange and a front wall including a bending shape; and the damping panel includes a bead curved more gradually compared to the bending shape.

(2) A frontal structure of a vehicle according to an aspect of the present invention includes: a dashboard lower section including a board curved part formed so as to be curved; and a damping panel welded at a vehicle chamber side of a position corresponding to the board curved part of the dashboard lower section, wherein a bead extending along an upper-lower direction is formed on the damping panel; and the bead is curved more gradually compared to the board curved part.

According to this configuration, the bead of the damping panel may prevent the board curved part of the dashboard lower section from bending and deforming. In addition, the difference between the curvature of the curved shape of the board curved part and the curvature of the curved shape of the damping panel allows a closed cross section structure to be formed between the board curved part and the damping panel. Therefore, even if the damping panel is thinned, a robust structure can be obtained, adequate to restrain the membrane oscillation of the damping panel. Thus, it is possible to reduce the material cost and the weight of the damping panel.

(3) The frontal structure of a vehicle may be configured as follows: the dashboard lower section includes a bent part at a portion above the board curved part, the bent part bending and extending along a front-rear direction; and an upper end of the bead reaches the bent part.

According to this configuration, it is possible to enhance the rigidity of the bending part. Thus, a deformation of the bending part is restrained.

(4) The frontal structure of a vehicle may be configured as follows: the damping panel includes an installment surface; the installment surface includes an opening part for installing a piping to install an air conditioning piping, the installment surface protruding towards the dashboard lower section; and the bead is formed toward a side of the opening part for installing a piping, in a left-right direction.

According to this configuration, even if an opening part for attaching a piping is formed on the dashboard lower section, the bead can be elongated in the upper-lower direction. Since the bead can be elongated in this way, the rigidity of the dashboard lower section may be further enhanced.

(5) The frontal structure of a vehicle may be configured as follows: the dashboard lower section and a front side frame are welded below the bead.

According to this configuration, the supporting rigidity of the rear end of the front side frame may be enhanced.

(6) The frontal structure of a vehicle may be configured as follows: the bead includes a curved bead and a perpendicular bead; the curved bead is formed above the bead at a position corresponding to the board curved part; the perpendicular bead is formed below the curved bead and extends along an upper-lower direction; and the curved bead is continuously connected with the perpendicular bead.

According to this configuration, it is possible to enhance the efficiency with which the damping panel reinforces the dashboard lower section.

(7) The frontal structure of a vehicle may be configured as follows: the frontal structure of a vehicle further includes an air conditioning boot; and a dashboard bead, wherein the dashboard lower section includes a bent part and a boot attachment surface to attach the air conditioning boot; the boot attachment surface protrudes towards an interior of a vehicle chamber and includes an opening part through which an air conditioning piping is inserted and penetrated; the air conditioning boot seals the opening part; the bent is formed at an upper rim of the dashboard lower section, bends and extends along a front-rear direction, and includes a bent bead; the dashboard bead is formed from an upper end of the boot attachment surface towards the bent part; and a ridge line of the bent bead is connected with a ridge line of the dashboard bead.

According to this configuration, a boot attachment surface of the dashboard lower section may be reinforced by the dashboard bead and the bending part bead. In this way, the rigidity of the boot attachment surface may be enhanced. As a result, it is possible to restrain the membrane oscillation of the dashboard lower section. At the same time, it is possible to enhance the NV characteristic of the air conditioning piping.

(8) The frontal structure of a vehicle may be configured as follows: the dashboard lower section is welded to a reinforcing plate below the boot attachment surface; and the damping panel is sandwiched between the dashboard lower section and the reinforcing plate.

According to this configuration, the rigidity of the boot attachment surface may be further enhanced. In addition, the NV characteristic of the air conditioning piping may be enhanced as well.

(9) The frontal structure of a vehicle may be configured as follows: the dashboard bead includes a plurality of steps in a left-right direction and protrudes towards a central portion in the left-right direction due to the plurality of steps.

In this way, the dashboard bead is configured to be a multiple layered structure obtained by stacking a plurality of bead layers. In addition, the height of the protrusion of the dashboard bead is made higher. As a result, the rigidity of the dashboard bead may be enhanced. Therefore, it is possible to further reinforce the dashboard lower section. Moreover, the membrane oscillation of the dashboard lower section may be restrained.

(10) The frontal structure of a vehicle may be configured as follows: the dashboard lower section includes a center frame extending along an upper-lower direction; and the opening part is formed between the center frame and the reinforcing plate.

According to this configuration, it is possible to further enhance the rigidity of the dashboard lower section. At the same time, the oscillation of the boot attachment surface may be restrained by the center frame and the reinforcing plate. Therefore, it becomes possible to further restrain the membrane oscillation of the dashboard lower section.

(11) The frontal structure of a vehicle may be configured as follows: a number of the bent bead that is formed is larger than a number of the dashboard bead that is formed.

According to this configuration, the rigidity of the bending part of the dashboard lower section may be enhanced. By enhancing the rigidity of the bending part, it is possible to restrain the membrane oscillation of the dashboard lower section beginning at the bending part.

(12) The frontal structure of a vehicle may be configured as follows: the frontal structure of a vehicle further includes a reinforcing plate, wherein the damping panel is sandwiched between the reinforcing plate and the dashboard lower section; the damping panel is welded to the dashboard lower section; the reinforcing plate includes a setting hole, an existence nonexistence determination hole, and a slippage determination hole; the damping panel is set to a predetermined position according to the setting hole; whether or not the damping panel exists between the reinforcing plate and the dashboard lower section is determined according to the existence nonexistence determination hole; whether or not the damping panel is placed at the predetermined position is determined according to the slippage determination hole; and the existence nonexistence determination hole is placed near the slippage determination hole.

According to this configuration, one can be prevented from forgetting to attach the damping material. At the same time, the damping material may be reliably placed at a desirable position. Further, due to the existence or nonexistence determination hole and the slippage determination hole, a third party may easily determine whether or not the damping material has been attached, and whether or not the damping material has been dislocated.

(13) The frontal structure of a vehicle may be configured as follows: the damping panel includes a panel hole; the panel hole is formed at a position corresponding to the slippage determination hole; and a radius of the panel hole is approximately equal to a radius of the slippage determination hole.

According to this configuration, when the damping material is set at a desirable position, the damping material is not exposed through the slippage determination hole. Meanwhile, if the damping material has dislocated, the damping material is exposed through the slippage determination hole. In this way, it is possible to determine easily whether the damping material has dislocated.

(14) The frontal structure of a vehicle may be configured as follows: the frontal structure of a vehicle further includes a bead, wherein the bead extends in an upper-lower direction, is formed toward a side of the existence nonexistence determination hole and the slippage determination hole in a left-right direction, and includes a bead curved part; and the bead curved part is curved more gradually compared to a shape of the board curved part of the dashboard lower section.

According to this configuration, the bead of the reinforcing plate may restrain the bending and deformation of a curved portion of the dashboard lower section. Furthermore, by forming a bead, the rigidity of the reinforcing plate may be enhanced. Thus, the thickness of the reinforcing plate and the thickness of the damping material may be reduced. At the same time, the membrane oscillation of the dashboard lower section may be restrained.

(15) The frontal structure of a vehicle may be configured as follows: the frontal structure of a vehicle further includes a bent part formed at an upper rim of the dashboard lower section, wherein the bent part is bent and extended along a front-rear direction; and an upper end of the bead extends to a tip of the bent part.

According to this configuration, the rigidity of the curved part may be enhanced. At the same time, the membrane oscillation of the dashboard lower section may be restrained.

(16) The frontal structure of a vehicle may be configured as follows: the frontal structure of a vehicle further includes an installment surface on the damping panel, wherein the installment surface protrudes towards the dashboard lower section, and includes an opening part for installing a piping to install an air conditioning piping; and the bead is formed toward a side of the opening part for installing a piping, in a left-right direction.

According to this configuration, even if an opening part for attaching a piping is formed on the dashboard lower section, a bead may be formed to be elongated in the upper-lower direction. Since the bead can be formed in an elongated manner, the rigidity of the dashboard lower section may be enhanced as well.

According to the present invention, the boot attachment surface of the dashboard lower section may be reinforced by the dashboard bead and the curved part bead. Thus, the rigidity of the boot attachment surface may be enhanced. Therefore, the membrane oscillation of the dashboard lower section may be restrained. At the same time, the NV characteristic of the air conditioning piping may be enhanced.

According to the present invention, the bending and deforming of the board curved part of the dashboard lower section may be restrained by the bead of the damping panel. Further, due to the difference between the curvature of the curved shape of the board curved part and the curvature of the curved shape of the damping panel, a closed cross section structure is formed between the board curved part and the damping panel. Therefore, even when the damping panel is made thinner, a rigid structure may be obtained to adequately restrain the membrane oscillation. In this way, it is possible to reduce the material cost and the weight of the damping panel.

According to the present invention, it is possible to prevent one from forgetting to attach the damping material. At the same time, the damping material may be reliably set to a desirable position. Furthermore, the existence or nonexistence determination hole and the slippage determination hole allow a third party to easily determine whether or not the damping material has been attached, and also determine whether or not the damping material has been displaced.

BRIEF DESCRIPTION OF THE DRAWINGS

FIG. 22 is a cross sectional view along line C-C of FIG. 19.

BEST MODE FOR CARRYING OUT THE INVENTION

Hereunder, a first embodiment of a frontal structure of a vehicle according to an aspect of the present invention is described with reference to the drawings.
(Frontal Structure of Vehicle)
(Dashboard Lower Section)

In the following description, a frontal direction in which the vehicle is moving may be simply referred to as a "frontal direction," a rear direction which is opposite to the direction in which the vehicle is moving may be simply referred to as a "rear direction," a direction to the right in the vehicle width direction may be simply referred to as a "right direction," a direction to the left in the vehicle width direction may be simply referred to as a "left direction," an upward direction which is opposite to the direction of the gravitational force may be simply referred to as an "upper direction," and a lower direction which corresponds to the direction of the gravitational force applies may be simply referred to as a "lower direction."

Figure 1:
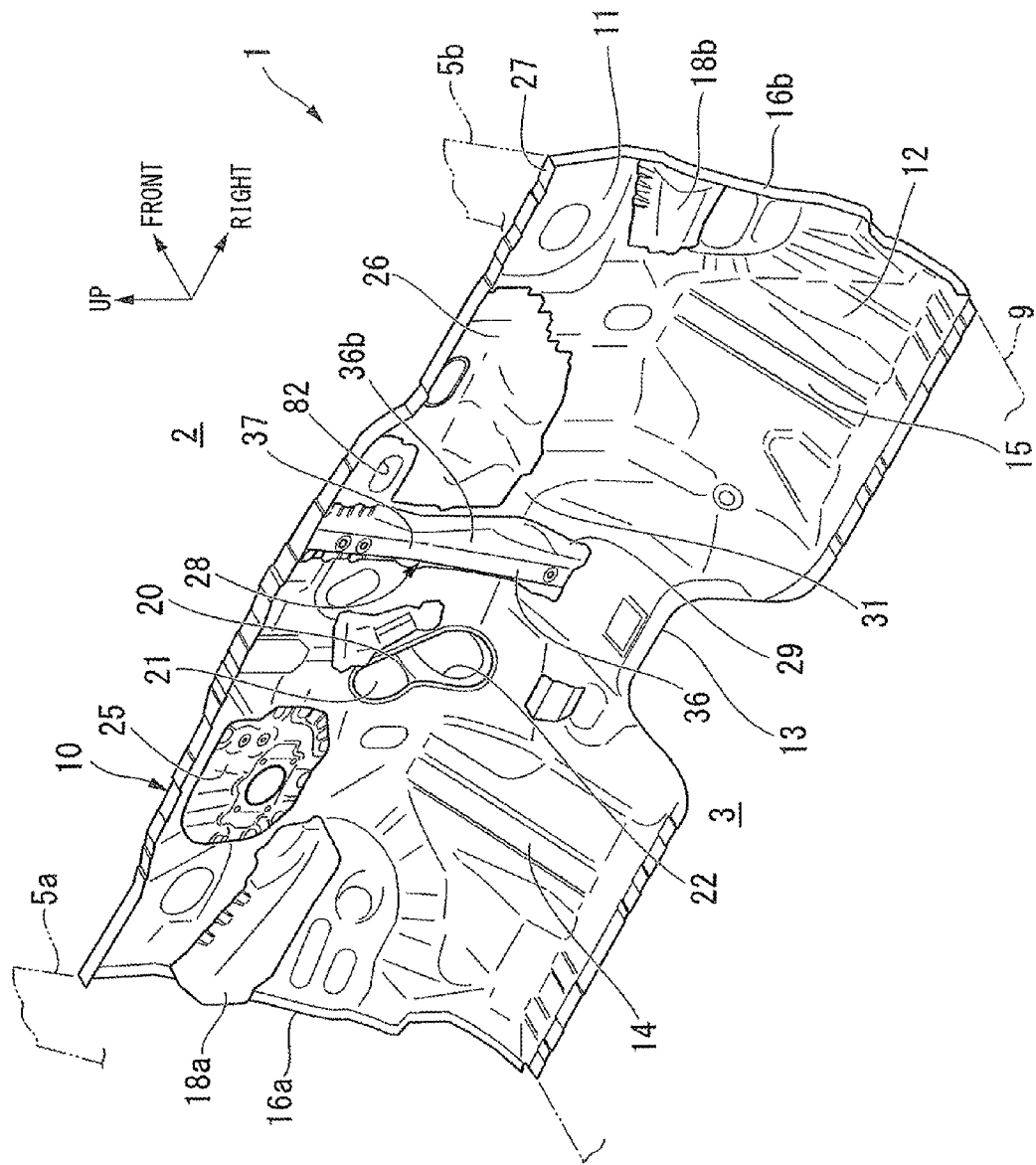
FIG. 1 is a perspective view of a dashboard lower section according to a first embodiment of the present invention seen from a cabin side.
Figure 2:
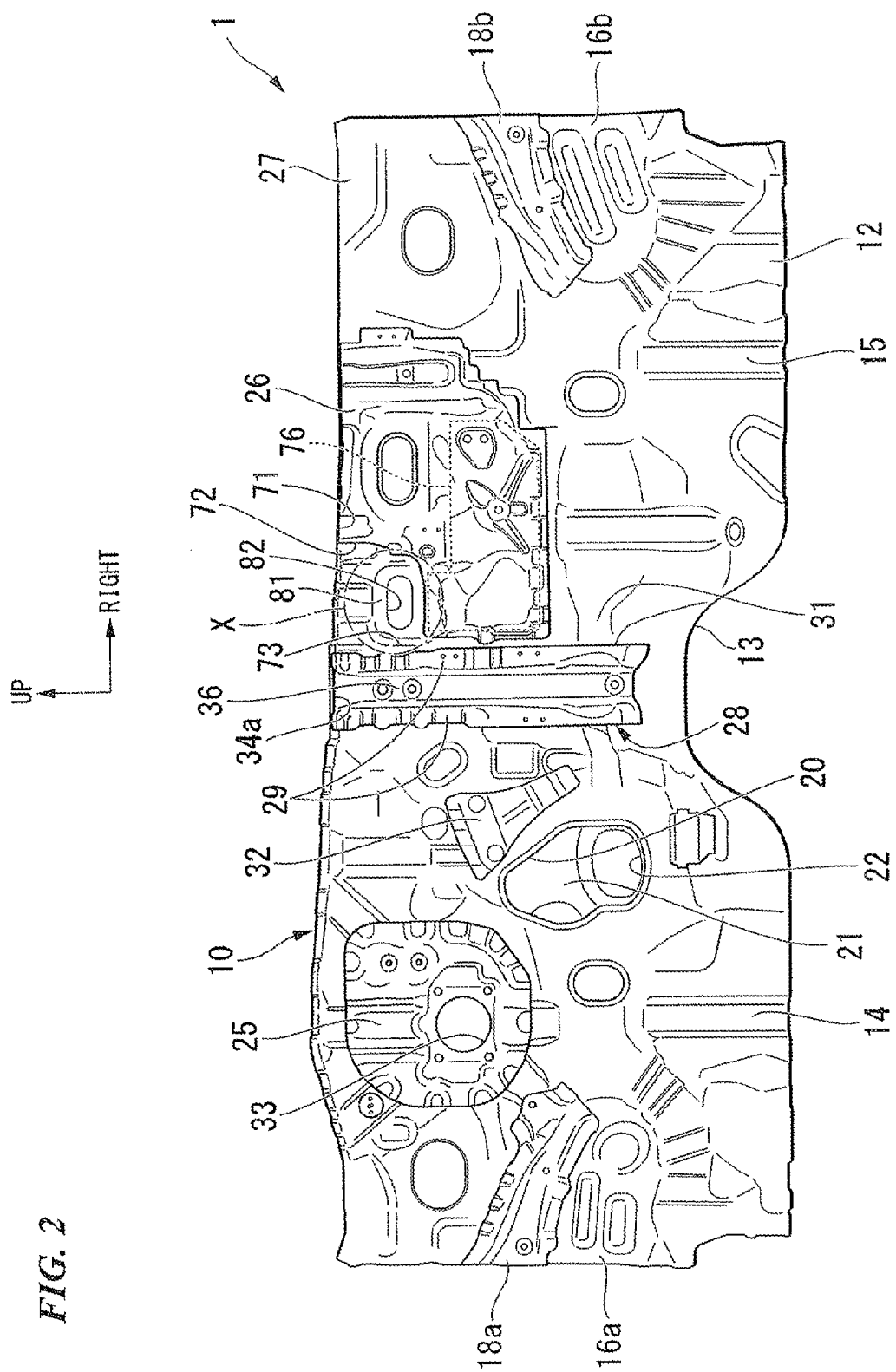
FIG. 2 is a planar view of a dashboard lower section according to a first embodiment of the present invention seen from a cabin side.

FIG. 1 is a perspective view of a dashboard lower section seen from a cabin side. FIG. 2 is a planar view of a dashboard lower section seen from a cabin side.

As shown in FIGS. 1-2, a vehicle frontal structure 1 includes an engine room 2, a cabin 3 placed behind the engine room 2, a dashboard lower section 10 separating the engine room 2 and the cabin 3, a pair of front pillars 5a, 5b placed on both the left and right sides of the dashboard lower section and elongating in an upper-lower direction, and a floor panel 9 welded to a lower rim of the dashboard lower section 10.

The dashboard lower section 10 is formed by applying a pressing operation to a planar metallic component. The dashboard lower section 10 includes a longitudinal wall 11 and a tilted wall 12. The longitudinal wall 11 is positioned along an upper-lower direction. The tilted wall 12 is extended as a descending slope from a lower portion of the longitudinal wall 11 in a rear direction. A wheel housing part 16a is provided at the left side, and a wheel housing part 16b is provided at the right side.

Each of the wheel housing parts 16a, 16b is formed so as to expand towards a cabin 3 side. Gazettes 18a, 18b are provided respectively at the upper portions of the wheel housing parts 16a, 16b.

A front side frame (not diagrammed) is spot-welded to the central end part, with respect to the vehicle width direction, of each of the gazettes 18a, 18b. On the other hand, the front pillar 5a is spot-welded to an outer side end part, with respect to the vehicle width direction, of the gazette 18a. Further, the front pillar 5b is spot-welded to an outer side end part, with respect to the vehicle width direction, of the gazette 18b.

A bent section 27 is formed at an upper rim of the longitudinal wall 11 of the dashboard lower section 10. The bent section 27 bends and extends towards the rear direction. A plurality of beads 49 are formed on the bent section 27 along the front-rear direction. The beads 49 protrude upwards, and are placed along the longitudinal direction of the bent section 27.

On the other hand, a tunnel part 13 is integrally to a central section, with respect to the vehicle width direction, of the tilted wall 12. The tunnel part 13 expands upwards. A driver-seat-side step part 14 is positioned to the left of the tunnel part 13. A passenger-seat-side step part 15 is positioned to the right of the tunnel part 13. The tunnel part 13 is placed between the driver-seat-side step part 14 and the passenger-seat-side step part 15.

Further, a center frame 28 is provided between the bent section 27 of the longitudinal wall 11 and the tunnel part 13. The center frame 28 extends in the upper-lower direction. This center frame 28 is a reinforcing member that enhances the rigidity of the dashboard lower section 10. The center frame 28 is configured by a frame main body 36 and a flange part 29. The frame main body 36 is formed so that the cross section is shaped approximately like the letter U. The flange part 29 bends and extends from both side rimes of the frame main body 36 towards an outer side. The center frame 28 is fixed so that an opening side faces the longitudinal wall 11 side. Thus, a closed cross section structure is formed between the longitudinal wall 11 and the center frame 28.

An upper end flange part 34a is formed at an upper end of the center frame 28. The upper end flange part 34a bends and extends towards a rear direction so as to overlap with the bent section 27 of the longitudinal wall 11. This upper end flange part 34a and the bent section 27 are overlapped with one another and are welded by spot-welding. In this way, a closed cross section structure 35 is formed between the center frame 28 and the bent section 27. (See FIGS. 5 and 6.)

An opening part 20 for a steering wheel is formed at a boundary part 71 of the driver-seat-side step part 14 between the longitudinal wall 11 and the tilted wall 12. The opening part 20 for the steering wheel connects the engine room 2 and the cabin 3. A steering shaft (not diagrammed) is inserted in the opening part 20 for the steering wheel. A steering joint cover 21 is attached to the opening part 20 for the steering wheel from the engine room 2 side. The steering joint cover 21 covers the opening part 20 for the steering wheel.

The steering joint cover 21 is shaped as a cup. The steering joint cover 21 is formed so as to bulge towards the engine room 2 side. A joint insertion opening 22 is formed on the steering joint cover 21. The joint insertion opening 22 is used to insert a steering shaft (not diagrammed) and a universal joint connected to the steering shaft.

Furthermore, at a surface at an engine room 2 side of the dashboard lower section 10, a dashboard cross member (not diagrammed) is provided at a position corresponding to the steering joint cover 21. This dashboard cross member is configured to be divided by the steering joint cover 21 into left and right sides. The left and right cross members are connected via this steering joint cover 21.

Here, a concaved part 31 is formed at a surface of the dashboard lower section 10 at a cabin 3 side at a component corresponding to the right side cross member (not diagrammed). The concaved part 31 is elongated in the left-right direction. The concaved part 31 is formed by bulging the dashboard lower section 10 towards an engine room 2 side. In this way, it is possible to further enhance the rigidity of a component of the dashboard lower section 10 corresponding to the dashboard cross member.

Further, an acceleration pedal bracket 32 is provided on a surface of the longitudinal wall 11 of the dashboard lower section 10 at the cabin 3 side. The acceleration pedal bracket 32 is used to assemble an acceleration pedal (not diagrammed). This acceleration pedal bracket 32 is provided at an upper right side of the opening part 20 for the steering wheel. Further, an installation hole 33 is provided on the longitudinal wall 11. The installation hole 33 is used to install a brake master cylinder (not diagrammed). This installation hole 33 is placed at an upper left side of the opening part 20 for the steering wheel.

A master cylinder stiffener 25 is provided on a surface of the longitudinal wall 11 at a cabin 3 side. The position of the master cylinder stiffener 25 corresponds to the installation hole 33. The master cylinder stiffener 25 is configured so that a pressing operation is performed on a planar metallic component, thereby forming an irregular surface. A brake master cylinder (not diagrammed) is fixed to this master cylinder stiffener 25.

Further, a damping material fixing panel 26 is provided at a surface of the longitudinal wall 11 at a cabin 3 side. The damping material fixing panel 26 is provided near a right side of the center frame 28. The damping material fixing panel 26 fixes a melting sheet 76, which is attached as a damping material of the dashboard lower section 10. The damping material fixing panel 26 is configured so that a pressing operation is performed on a planar metallic component, thereby forming an irregular surface.

In addition, a flange part 71 is formed at an upper rim of the damping material fixing panel 26. The flange part 71 bends and extends towards a rear direction. This flange part 71 overlaps with the bent section 27 of the dashboard lower section 10. Furthermore, a cut out part 72 is formed at an upper left area of the damping material fixing panel 26. The cut out part 72 is formed by cutting out a large portion of the damping material fixing panel 26. Due to this cut out part 72, an exposed part 73 is formed between the center frame 28 and the damping material fixing panel 26. The dashboard lower section 10 is exposed through the exposed part 73.

Figure 3:
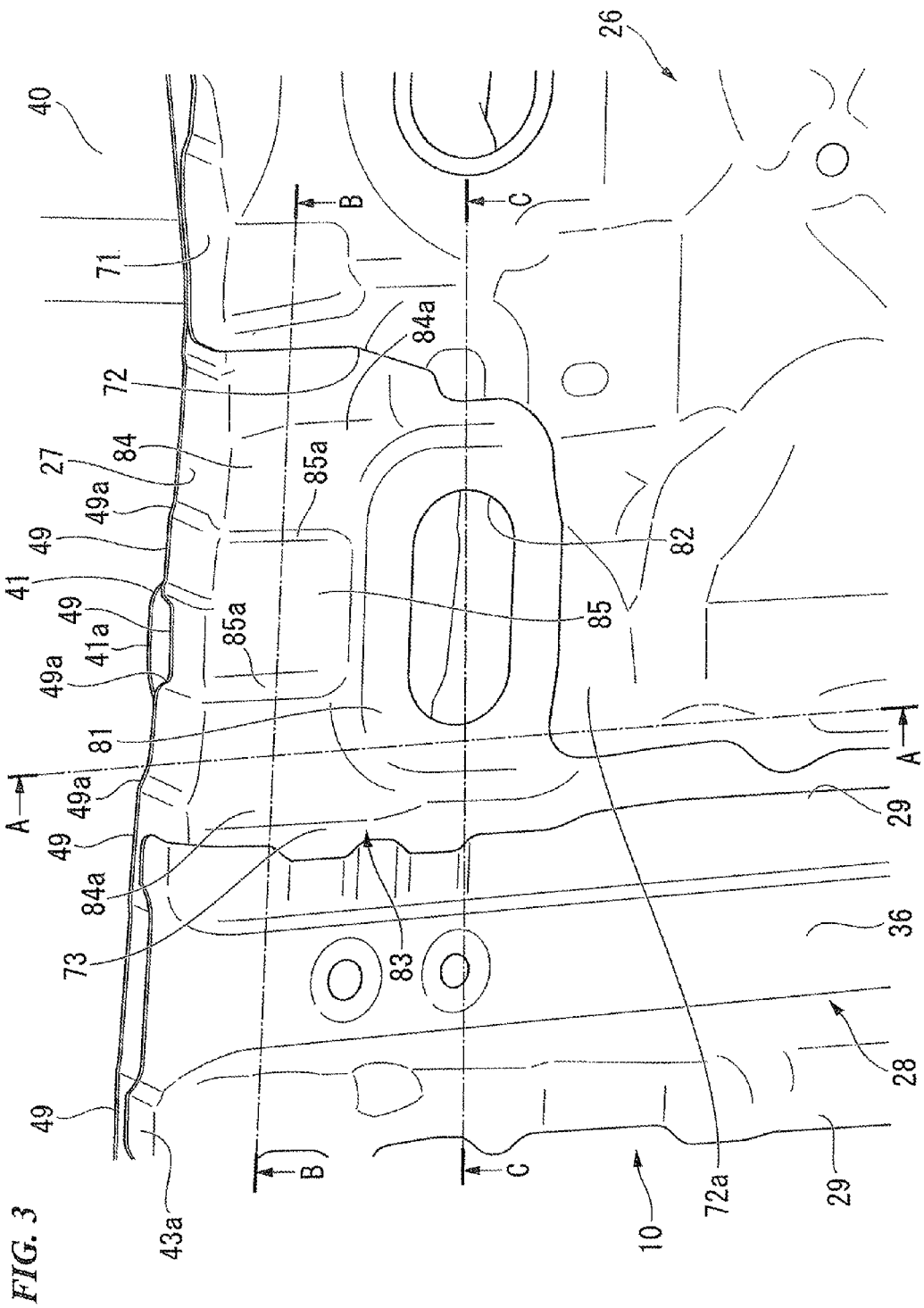
FIG. 3 is an enlarged view of part X in FIG. 2.
Figure 4:
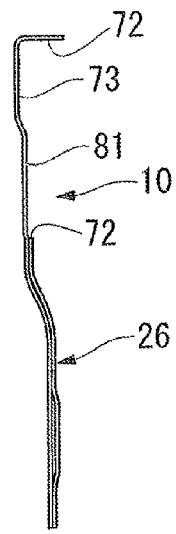
FIG. 4 is a cross sectional view along line A-A of FIG. 3.
Figure 5:
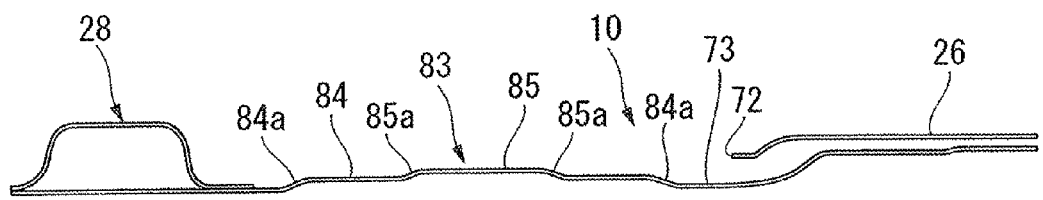
FIG. 5 is a cross sectional view along line B-B of FIG. 3.
Figure 6:
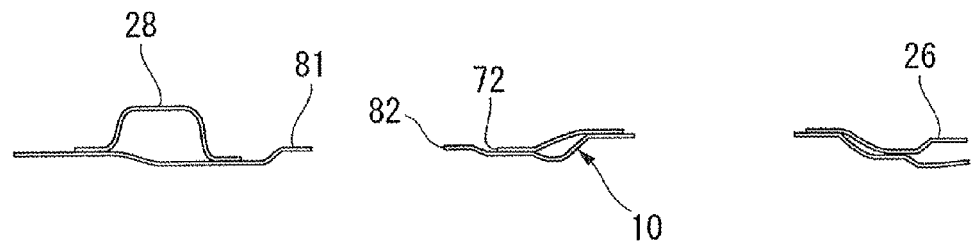
FIG. 6 is a cross sectional view along line C-C of FIG. 3.

FIG. 3 is an enlarged view of part X in FIG. 2. FIG. 4 is a cross sectional view along line A-A of FIG. 3. FIG. 5 is a cross sectional view along line B-B of FIG. 3. FIG. 6 is a cross sectional view along line C-C of FIG. 3.

As shown in FIGS. 3-6, a boot attachment surface 81 is formed at the exposed part 73 of the dashboard lower section 10. The boot attachment surface 81 is formed at approximately the entire lower half of the exposed part 73. The boot attachment surface 81 protrudes towards the cabin 3 side. An opening part 82 for an air conditioner is formed at a major portion of a central part of the boot attachment surface 81. In other words, the boot attachment surface 81 and the opening part 82 for an air conditioner are formed between the center frame 28 and the damping material fixing panel 26.

An air conditioning piping 92 of the air conditioning unit 91, described later, passes through the opening part 82 for an air conditioner. An air conditioning boot 93 is attached to the boot attachment surface 81. The air conditioning boot 93 assures that the opening part 82 for an air conditioner is sealed.

A lower side of the boot attachment surface 81 is connected with a lower rim part 72a of the cut out part 72 of the damping material fixing panel 26. Further, a dashboard bead 83 is formed between the boot attachment surface 81 and the bent section 27. The dashboard bead 83 bridges the boot attachment surface 81 and the bent section 27. The dashboard bead 83 is formed so as to possess four steps in the left-right direction.

In other words, the dashboard bead 83 includes a first bead 84 and a second bead 85. The width of the first bead 84 is approximately equal to the width of the boot attachment surface 81 in the left-right direction. The second bead 85 is integrally formed on the first bead 84. The second bead 85 is placed at approximately a central portion of the first bead 84 in the left-right direction. In this way, the dashboard bead 83 is configured to be a two-step bead. Due to the steps described above, the height of the protrusion of the dashboard bead 83 increases toward a central portion in the left-right direction.

In this way, one dashboard bead 83 is formed between the boot attachment surface 81 and the bent section 27. Meanwhile, a plurality of beads 49 are formed on the bent section 27 along the longitudinal direction of the bent section 27. In other words, the number of beads 49 formed on the bent section 27 is set to be greater than the number of dashboard bead 83.

Moreover, a ridge line 49a of the bead 49 of the bent section 27, a ridge line 84a of the first bead 84, and a ridge line 85a of the second bead 85 are connected. As described above, the dashboard bead 83 includes the first bead 84 and the second bead 85.

Incidentally, as shown in FIG. 3, the bent section 27 of the dashboard lower section 10 is spot-welded to the flange part 41 formed in the peripheral of a dashboard upper section 40.

A flange bead 41a is formed on the flange 41 of the dashboard upper section 40 at a portion corresponding to the first bead 84 of the dashboard bead 83. The flange bead 41 protrudes upwards. A closed cross sectional structure is formed by the flange bead 41a and the bead 49 formed on the bent section 27 of the dashboard lower section 10. As a result, the rigidity of the bent section 27 is enhanced.

Figure 7:
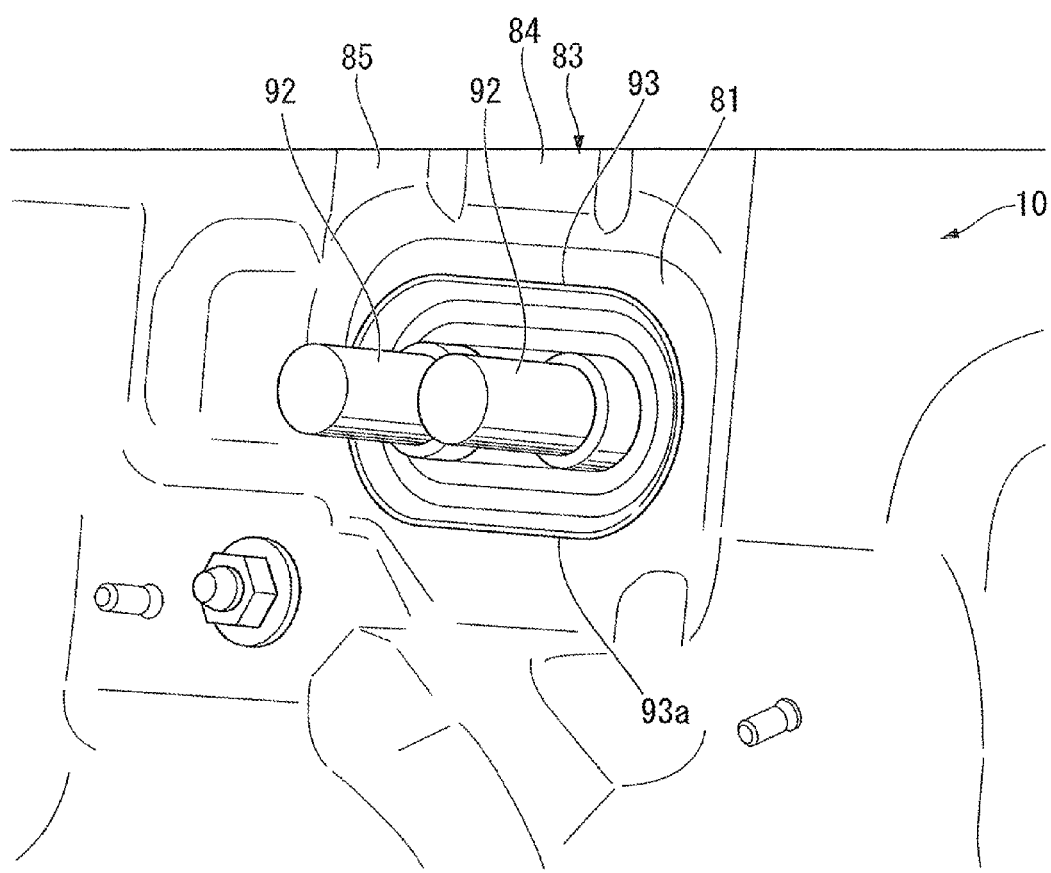
FIG. 7 is a perspective view of a boot attachment surface according to a first embodiment of the present invention seen from an engine room side.
Figure 8:
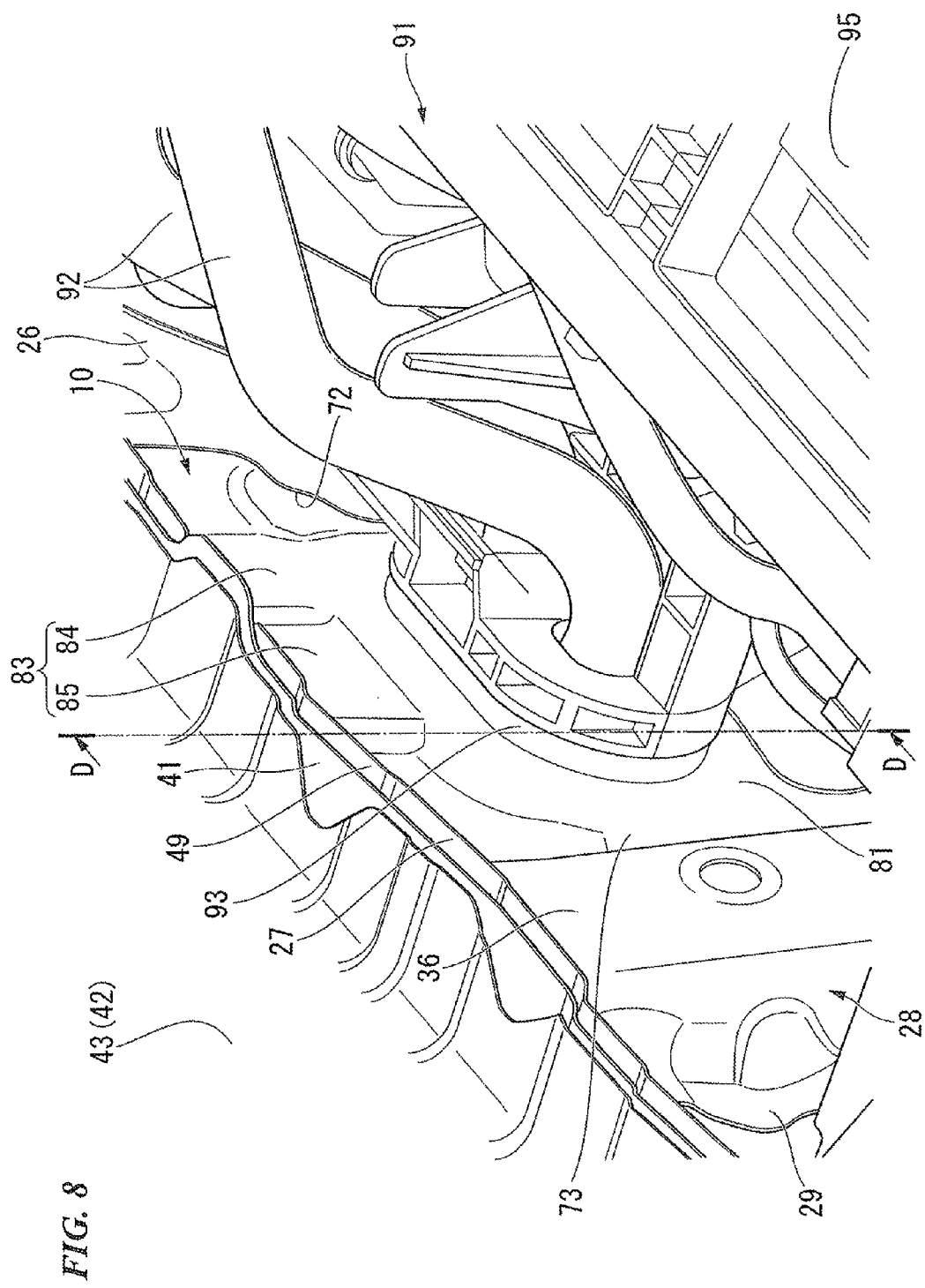
FIG. 8 is a perspective view of a boot attachment surface according to a first embodiment of the present invention seen from an cabin side.
Figure 9:
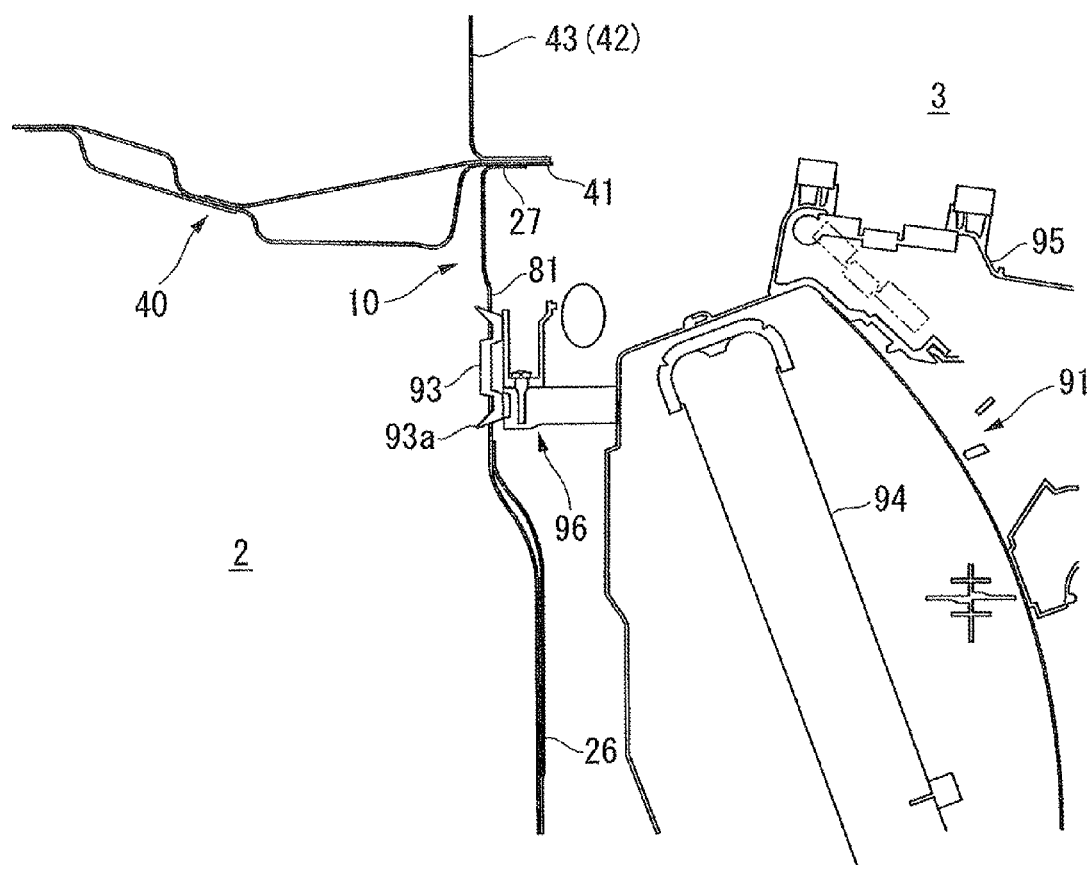
FIG. 9 is a cross sectional view along line D-D of FIG. 8.

FIG. 7 is a perspective view of a boot attachment surface seen from an engine room side. FIG. 8 is a perspective view of a boot attachment surface seen from an cabin side. FIG. 9 is a cross sectional view along line D-D of FIG. 8.

As shown in FIGS. 7-9, the air conditioning piping 92 is passed through the opening part 82 for an air conditioner formed on the dashboard lower section 10. The air conditioning piping 92 is included in the air conditioning unit 91. The air conditioning unit 91 is a cooling cycle equipment including a non-diagrammed compression device, a condenser, a blower, and an evaporator 94. The air conditioning piping 92 connects the compressor, the condenser, and the evaporator 94. In other words, the interior of the air conditioning piping 92 is a refrigerant gas flow channel.

The compressor and the condenser (not diagrammed) are placed within the engine room 2, with the dashboard lower section 10 placed in between. Meanwhile, the evaporator 94 is placed at the cabin 3 side, with the dashboard lower section 10 placed in between. An instrument panel 95 is provided in the cabin 3. The instrument panel 95 is elongated along the left-right direction towards a rear direction compared to the dashboard lower section 10. The evaporator and the blower (not diagrammed) are placed within the instrument panel 95. Therefore, the air conditioning piping 92 is provided across the engine room 2 side and the cabin 3 side via the opening part 82 for an air conditioner of the dashboard lower section 10.

Furthermore, an air conditioning boot 93 is fixed to an interior of the opening part 82 for an air conditioner of the boot attachment surface 81. The air conditioning boot 93 ensures that the opening part 82 for an air conditioner is sealed. The air conditioning boot 93 also prevents water and dust from entering through the opening part 82 for an air conditioner from the engine room 2 side.

The air conditioning boot 93 includes a skirt part 93a surrounding the opening part 82 for an air conditioner and the air conditioning piping 92. The air conditioning piping 92 is placed near the opening part 82 for an air conditioner. The cross section of the skirt part 93a is shaped approximately as a long oval. The skirt part 93a spreads towards the engine room 2 side. This skirt part 93a is placed in the interior of the opening part 82 for an air conditioner.

Further, a supporting block 96 is attached to the boot attachment surface 81 via the air conditioning boot 93. This supporting block 96 supports the air conditioning piping 92 and the evaporator 94.

In addition, as shown in detail in FIGS. 8 and 9, the bent section 27 of the dashboard lower section 10 is connected to the front glass supporting panel 42 via the dashboard upper section 40. The front glass supporting panel 42 is formed by applying a pressing operation and the like to a planar metallic component. The front glass supporting panel 42 includes a longitudinal wall 43 formed on a same plane as the longitudinal wall 11 of the dashboard lower section 10.

(Effects)

Therefore, according to the first embodiment described above, a dashboard bead 83 is formed between the boot attachment surface 81 and the bent section 27 of the dashboard lower section 10. The boot attachment surface 81 is formed by protruding the dashboard lower section 10 towards a cabin 3 side. The dashboard bead 83 bridges the boot attachment surface 81 and the bent section 27. In this way, it is possible to enhance the rigidity of the boot attachment surface. In addition, the dashboard bead 83 is configured to have a two-step structure including the first bead 84 and the second bead 85. Therefore, it is possible to enhance the rigidity of the dashboard bead 83 itself. Furthermore, the ridge line 84a of the bead 84, the ridge line 85a of the bead 85, and the ridge line 49a of the bead 49 of the bent section 27 are connected. As a result, the boot attachment surface 81 can be reliably reinforced due to the dashboard bead 83 and the bead 49.

Therefore, even when a vibration of an engine (not diagrammed) or noise of a road is transmitted to the dashboard lower section 10 via the air conditioning boot 93 attached to the boot attachment surface 81, it is possible to restrain the membrane oscillation of this dashboard lower section 10. At the same time, it is possible to enhance the NV characteristic of the air conditioning piping 92.

Furthermore, a lower side of the boot attachment surface 81 is connected to the lower rim part 72a of the cut out part 72 formed on the dashboard lower section 10. Therefore, the rigidity of the boot attachment surface 81 may be further enhanced. At the same time, it is possible to enhance the NV characteristic of the air conditioning piping 92.

Furthermore, the boot attachment surface 81 is formed between the center frame 28 and the damping material fixing panel 26. Therefore, the rigidity of the boot attachment surface 81 may be further enhanced. In addition, due to the center frame and the damping material fixing panel 26, it is possible to restrain the vibration transmitted to the boot attachment surface 81. As a result, the membrane oscillation of the dashboard lower section 10 may be restrained.

In addition, the number of beads 49 formed on the bent section 27 is set to be greater than the number of dashboard bead 83. Thus, the rigidity of the bent section 27 may be enhanced. As a result, the rigidity of the overall dashboard lower section 10 may be enhanced. Consequently, it is possible to restrain the membrane oscillation of the dashboard lower section 10 beginning at the bending part 27.

While a preferred embodiment of the present invention has been described above, it should be understood that these are exemplary of the invention and are not to be considered as limiting the present invention. Additions, omissions, substitutions, and other modifications can be made without departing from the scope of the present invention.

For example, in the first embodiment described above, the dashboard bead 83 was formed between the boot attachment surface 81 and the bent section 27 of the dashboard lower section 10. The dashboard bead 83 was formed so as to include four steps in the left-right direction. In other words, the dashboard bead 83 was configured to have a two-step structure including the first bead 84 and the second bead 85. However, the present invention is not limited to this configuration. The dashboard bead 83 may be configured to include two or more steps.

Further, according to the above embodiment, an instance was described in which metallic welding of various components was made by spot-welding. However, the present invention is not limited to this embodiment. A known metallic welding method such as arc welding like TIG (Tungsten Inert Gas) welding, MIG (Metallic Inert Gas) welding, and plasma welding; laser welding; and electron beam welding may be used as well, as appropriate.

Further, in the embodiment described above, a bent section 27 is formed at an upper rim of the longitudinal wall 11 of the dashboard lower section 10. The bent section 27 bends and extends towards a rear direction. However, as long as the bent section 27 bends and extends in the front-rear direction, the bent section 27 may be configured to bend and extend from the upper rim of the longitudinal wall 11 towards a frontal direction.

(Frontal Structure of Vehicle)
(Dashboard Lower Section)

Hereunder, a second embodiment of a frontal structure of a vehicle according to an aspect of the present invention is described with reference to the drawings. In the following description, a frontal direction in which the vehicle is moving may be simply referred to as a "frontal direction," a rear direction which is opposite to the direction in which the vehicle is moving may be simply referred to as a "rear direction," a direction to the right in the vehicle width direction may be simply referred to as a "right direction," a direction to the left in the vehicle width direction may be simply referred to as a "left direction," an upward direction which is opposite to the direction of the gravitational force may be simply referred to as an "upper direction," and a lower direction which corresponds to the direction of the gravitational force applies may be simply referred to as a "lower direction."

Figure 10:
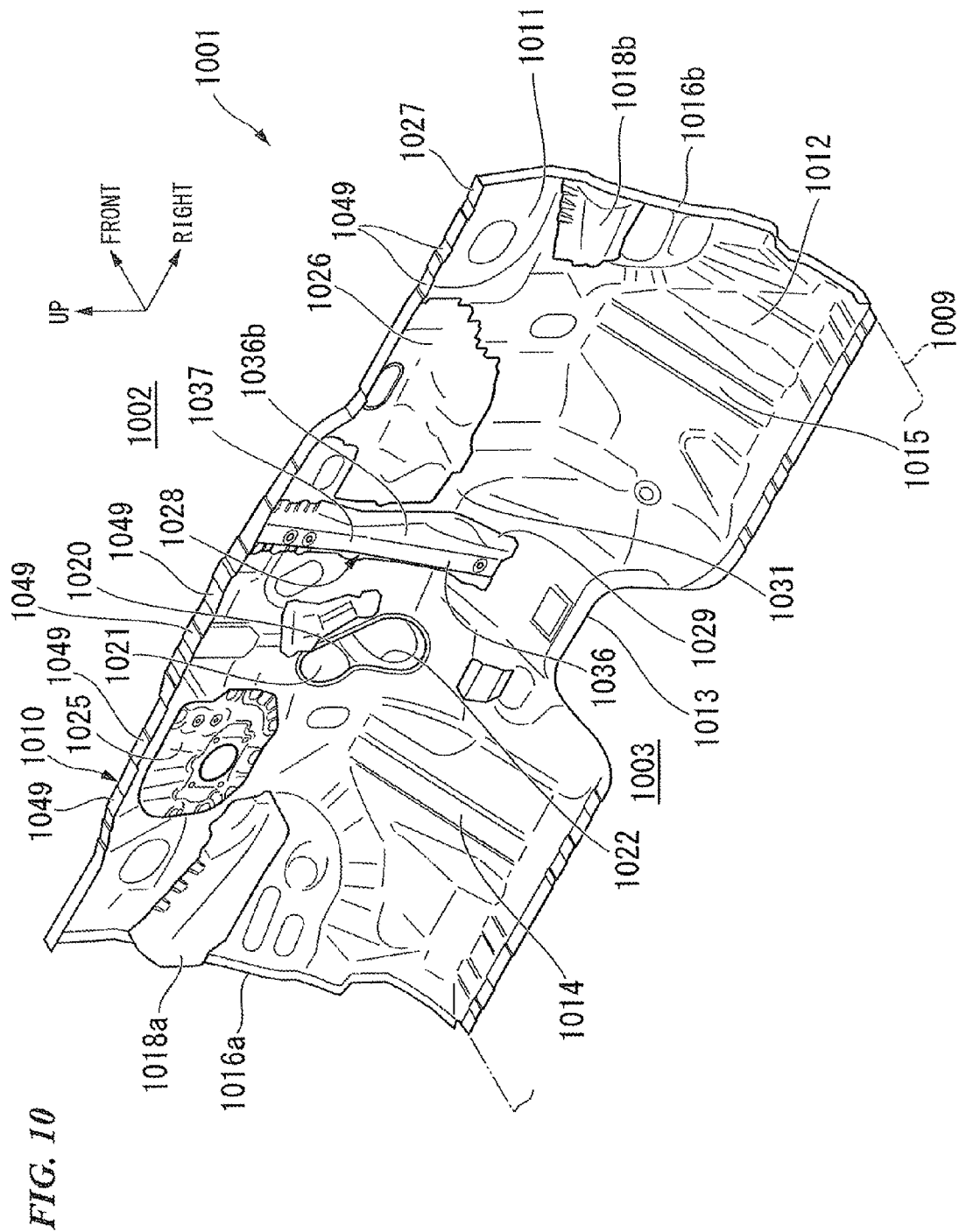
FIG. 10 is a perspective view of a dashboard lower section according to a second embodiment of the present invention seen from a cabin side.
Figure 11:
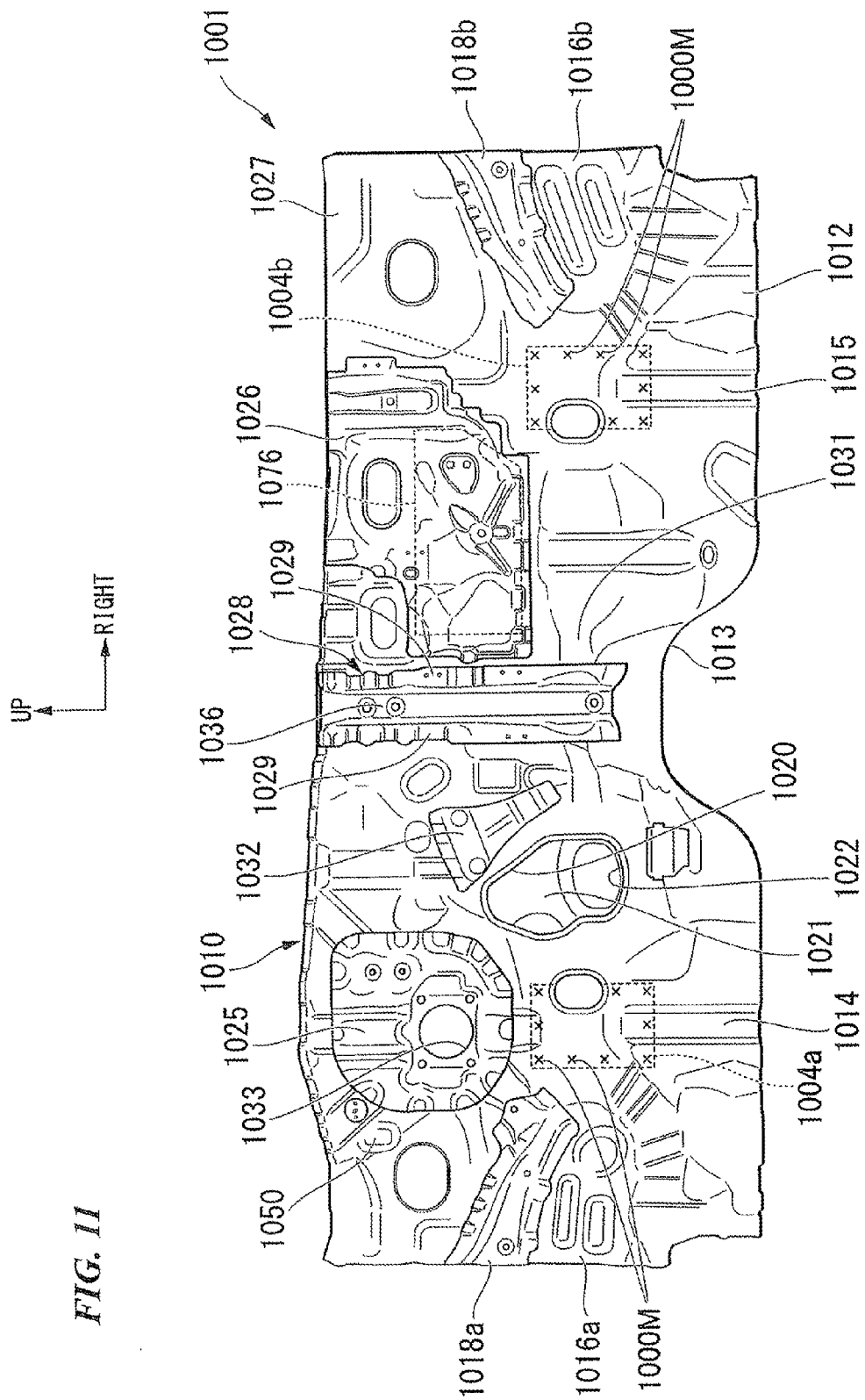
FIG. 11 is a planar view of a dashboard lower section according to a second embodiment of the present invention seen from a cabin side.
Figure 12:
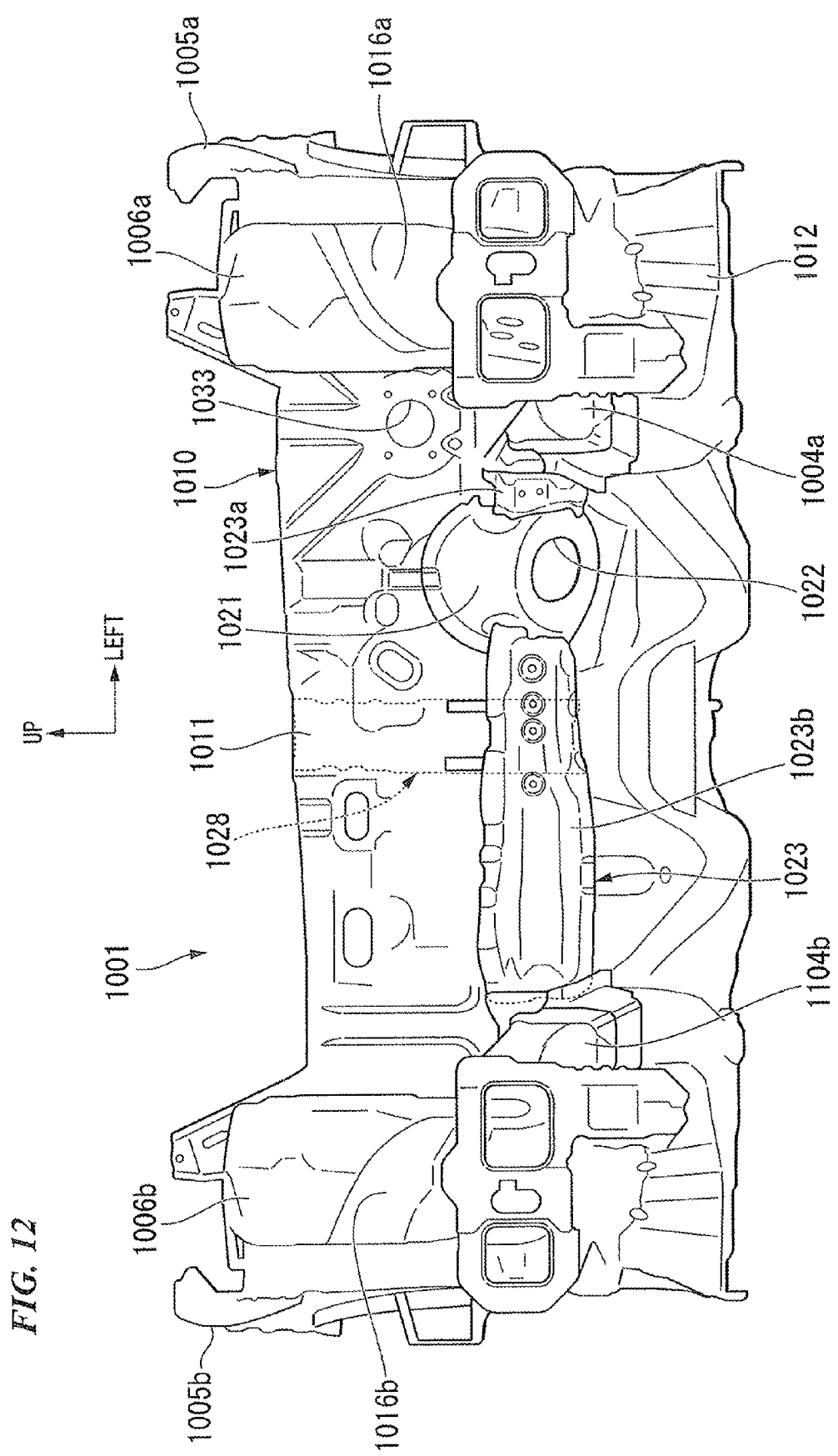
FIG. 12 is a planar view of a dashboard lower section according to a second embodiment of the present invention seen from an engine room side.

FIG. 10 is a perspective view of a dashboard lower section seen from a cabin side. FIG. 11 is a planar view of a dashboard lower section seen from a cabin side. FIG. 12 is a planar view of the dashboard lower section seen from an engine room side.

As shown in FIGS. 10-12, a vehicle frontal structure 1001 includes a frontal side frame 1004a, 1004b, a front pillar 1005a, 1005b, an upper member 1006a, 1006b, a dashboard lower section 1010, and a floor panel 1009. The frontal side frame 1004a, 1004b is positioned at a frontal side. A pair of frontal side frames 1004a, 1004b make up the left and right frames of an engine frame 1002. The front pillar 1005a, 1005b is placed at a rear side with respect to the frontal side frames 1004a, 1004b. At the same time, the front pillar 1005a, 1005b is placed at the left and right outer sides with respect to the frontal side frame 1004a, 1004b. Further, the front pillar 1005a, 1005b extends in the upper-lower direction. The upper member 1006a, 1006b is placed above the front side frames 1004a, 1004b. The front ends of each of the upper members 1006a, 1006b are welded to the front ends of the front side frame 1004a, 1004b. The rear ends of each of the upper members 1006a, 1006b are welded to the front pillar 1005a, 1005b. The dashboard lower section 1010 separates the engine room 1002 and the cabin 1003 positioned behind the engine room 1002. The dashboard lower section 1010 is welded to the front side frames 1004a, 1004b, the front pillars 1005a, 1005b, and the upper members 1006a, 1006b. The floor panel 1009 is welded to the lower rim of the dashboard lower member 1010.

The dashboard lower section 1010 is formed by applying a pressing operation to a planar metallic component. The dashboard lower section 1010 includes a longitudinal wall 1011 and a tilted wall 1012. The longitudinal wall 1011 is positioned along an upper-lower direction. The tilted wall 1012 is extended as a descending slope from a lower portion of the longitudinal wall 1011 in a rear direction. A wheel housing part 1016a is provided at the left side, and a wheel housing part 1016b is provided at the right side.

Each of the wheel housing parts 1016a, 1016b is formed so as to expand towards a cabin 1003 side. Gazettes 1018a, 1018b are provided respectively at the upper portions of the wheel housing parts 1016a, 1016b.

The rear ends of each of the front side frames 1004a, 1004b are spot-welded to the central end part, with respect to the vehicle width direction, of each of the gazettes 1018a, 1018b. The dashboard lower section 1010 is placed between the gazette 1018a and the front side frame 1004a, and between the gazette 1018b and the front side frame 1004b. On the other hand, the front pillar 1005a is spot-welded to an outer side end part, with respect to the vehicle width direction, of the gazette 1018a. Further, the front pillar 1005b is spot-welded to an outer side end part, with respect to the vehicle width direction, of the gazette 1018b. In FIG. 11, reference 1000M refers to a point at which the dashboard lower section 1010 and each rear end of the front side frame 10004a, 1004b are spot-welded.

A bent section 1027 is formed at an upper rim of the longitudinal wall 1011 of the dashboard lower section 1010. The bent section 1027 bends and extends towards the rear direction. A plurality of beads 1049 are formed on the bent section 1027 along the front-rear direction. The beads 1049 protrude upwards, and are placed along the longitudinal direction of the bent section 1027. On the other hand, a tunnel part 1013 is integrally to a central section, with respect to the vehicle width direction, of the tilted wall 1012 and the horizontal wall 1007. The tunnel part 1013 expands upwards. A driver-seat-side step part 1014 is positioned to the left of the tunnel part 1013. A passenger-seat-side step part 1015 is positioned to the right of the tunnel part 1013. The tunnel part 1013 is placed between the driver-seat-side step part 1014 and the passenger-seat-side step part 1015.

Further, a center frame 1028 is provided between the bent section 1027 of the longitudinal wall 1011 and the tunnel part 1013. The center frame 1028 extends in the upper-lower direction. This center frame 1028 is a reinforcing member that enhances the rigidity of the dashboard lower section 1010.

An opening part 1020 for a steering wheel is formed at a boundary part of the driver-seat-side step part 1014 between the longitudinal wall 1011 and the tilted wall 1012. The opening part 1020 for the steering wheel connects the engine room 1002 and the cabin 1003. A steering shaft (not diagrammed) is inserted in the opening part 1020 for the steering wheel. A universal joint connected to the steering shaft is also inserted in the opening part 1020.

Here, a steering joint cover 1021 is attached to the opening part 1020 for the steering wheel. The steering joint cover 1021 covers the opening part 1020 for the steering wheel. The steering joint cover 1021 is assembled to the opening part 1020 for the steering wheel from the engine room 1002 side. The steering joint cover 1021 is shaped as a cup. The steering joint cover 1021 is formed so as to bulge towards the engine room 1002 side. A joint insertion opening 1022 is formed on the steering joint cover 1021. The joint insertion opening 1022 is used to insert a steering shaft (not diagrammed) and the universal joint.

Furthermore, at a surface at an engine room 1002 side of the dashboard lower section 1010, a dashboard cross member 1023 is provided at a position corresponding to the steering joint cover 1021. The dashboard cross member 1023 bridges the left and right front side frames 1004a, 1004b. The dashboard cross member 1023 is formed so that the cross section is shaped approximately as a hat. The dashboard cross member 1023 is used, for example, to enhance the rigidity of the dashboard lower section 1010 and to scatter the frontal collision load. A closed cross section structure is formed by spot-welding an opening side of the dashboard cross member 1023 towards the dashboard lower section 1010 side.

Furthermore, the dashboard cross member 1023 is configured to be divided by the steering joint cover 1021 into left and right sides. In other words, the dashboard cross member 1023 is configured by the left cross member 1023a and the right cross member 1023b.

Furthermore, an end of each of the left and right cross members 1023a and 1023b is spot welded to the steering joint cover 1021. In other words, the left and right cross members 1023a, 1023b are connected via the steering joint cover 1021.

Meanwhile, the other end of the left cross member 1023a is spot-welded to the corresponding left front side frame 1004a located at a left side. Further, the other end of the right cross member 1023b is spot-welded to the corresponding right front side frame 1004b located at a right side.

Incidentally, at a surface at a cabin 1003 side of the dashboard lower section 1010, a concaved part 1031 is formed at a component corresponding to the right cross member 1023b so that the concaved part 1031 is elongated in the left-right direction. The concaved part 1031 is formed by making the dashboard lower section 1010 bulge towards the engine room 1002 side. In this way, it is possible to further enhance the rigidity of a component corresponding to the dashboard cross member 1023 of the dashboard lower section 1010.

Further, an acceleration pedal bracket 1032 is provided on a surface of the longitudinal wall 1011 of the dashboard lower section 1010 at the cabin 1003 side. The acceleration pedal bracket 1032 is used to assemble an acceleration pedal (not diagrammed). This acceleration pedal bracket 1032 is provided at an upper right side of the opening part 1020 for the steering wheel. Further, an installation hole 1033 is provided on the longitudinal wall 1011. The installation hole 1033 is used to install a brake master cylinder (not diagrammed). This installation hole 1033 is placed at an upper left side of the opening part 1020 for the steering wheel.

A master cylinder stiffener 1025 is provided on a surface of the longitudinal wall 1011 at a cabin 1003 side. The position of the master cylinder stiffener 1025 corresponds to the installation hole 1033. The master cylinder stiffener 1025 is configured so that a pressing operation is performed on a planar metallic component, thereby forming an irregular surface. A brake master cylinder (not diagrammed) is fixed to this master cylinder stiffener 1025.

Further, an opening part 1082 for an air conditioner is formed at an upper portion of the longitudinal wall 1011. The opening part 1082 for an air conditioner is formed to the right side of the center frame 1028. In addition, an opening part 1086 for installing a piping is formed to the right side of the opening part 1082 for an air conditioner. An air conditioning piping of an air conditioning unit (not diagrammed) passes through the opening part 1082 for an air conditioner. A boot attachment surface 1081 is an area surrounding a portion of the dashboard lower section 1010 at which the opening part 1082 for an air conditioner is formed. The boot attachment surface 1081 is formed so as to protrude towards the cabin 1003 side. An air conditioning boot (not diagrammed) is attached to the boot attachment surface 1081. The air conditioning boot ensures that the opening part 1082 for an air conditioner is sealed.

Further, a dashboard bead 1083 is formed between the boot attachment surface 1081 and the bent section 1027. The dashboard bead 1083 bridges the boot attachment surface 1081 and the bent section 1027. The dashboard bead 1083 is configured as a two-step bead. The height of the protrusion of the dashboard bead 1083 becomes higher towards a central part in the left-right direction due to the steps. The ridge line 1049*a* of the bead 1049 of the bent section 1027 is formed to be continuous with the ridge line 1083*a* of the dashboard bead 1083.

In addition, a damping panel 1090 is connected to a surface of the longitudinal wall 1011 at the cabin 1003 side. The damping panel 1090 is placed near the right side of the center frame 1028.

(Damping Panel)
(Damping Material Fixing Panel)

Figure 13:
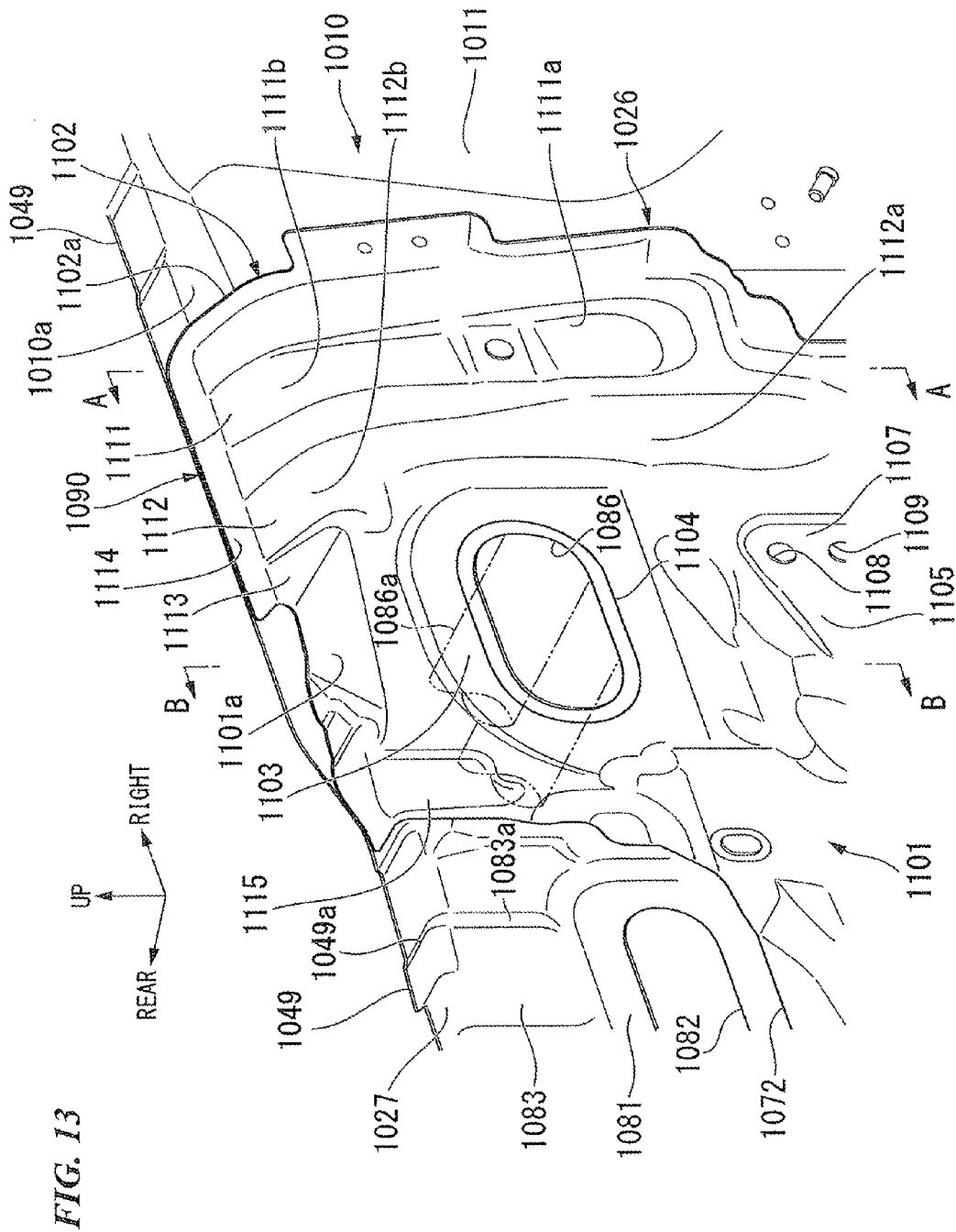
FIG. 13 is a perspective of a main part of a damping panel according to a second embodiment of the present invention.
Figure 14:
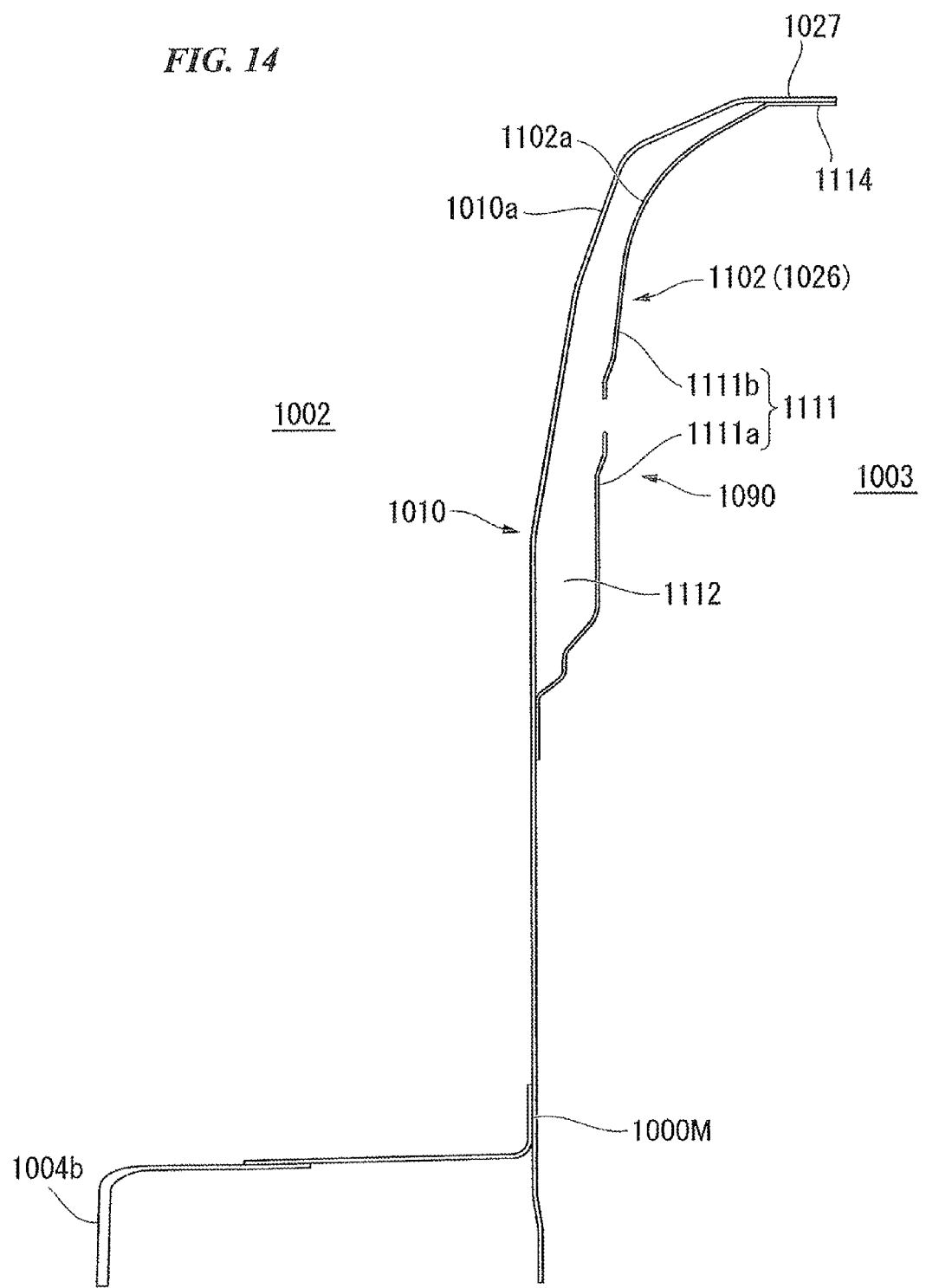
FIG. 14 is a cross sectional view along line A-A of FIG. 13.
Figure 15:
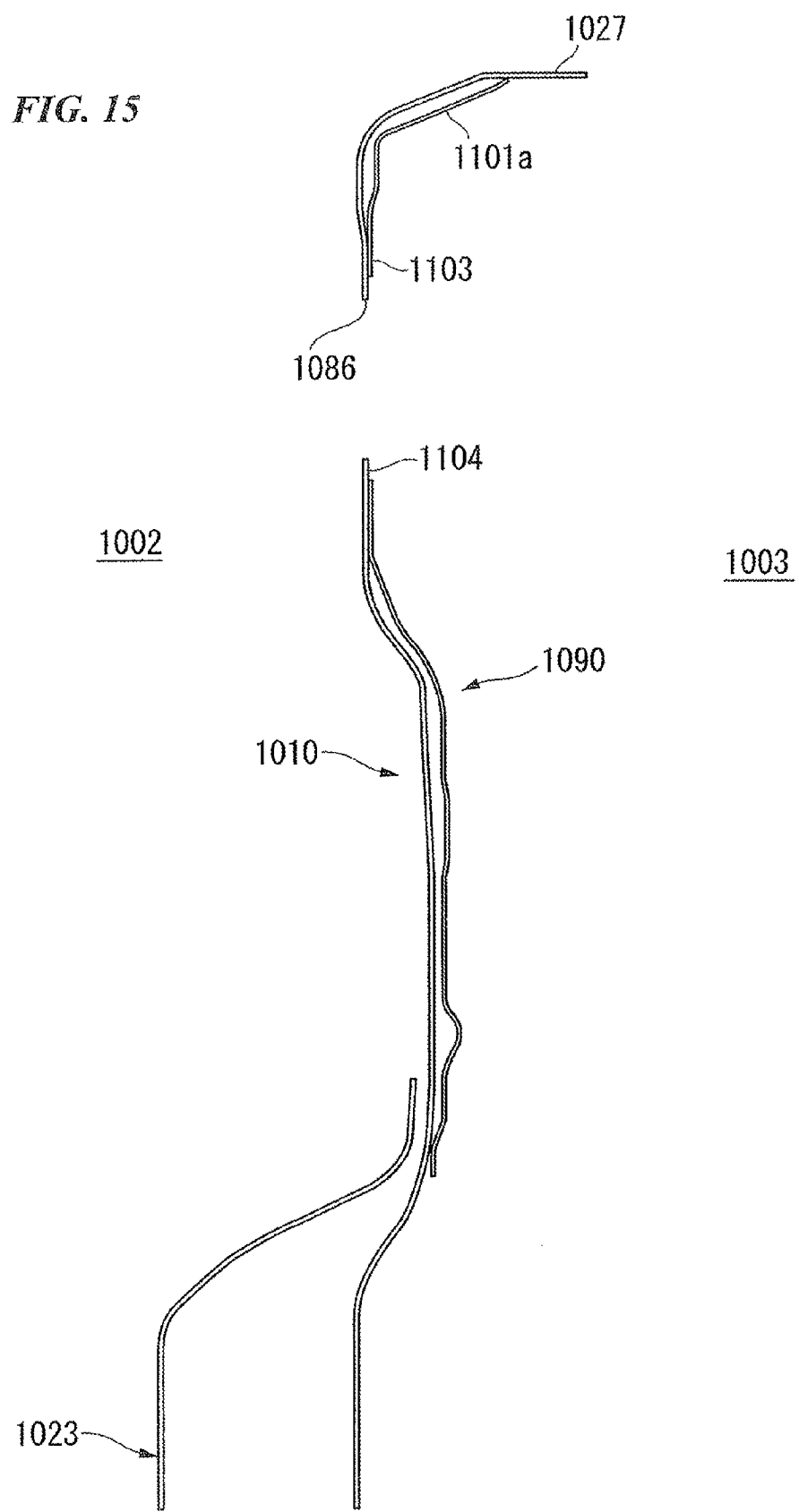
FIG. 15 is a cross sectional view along line B-B of FIG. 13.

FIG. 13 is a perspective view of a damping panel. FIG. 13 shows an area near the opening part for installing a piping. FIG. 14 is a cross sectional view along line A-A in FIG. 13. FIG. 15 is a cross sectional view along line B-B in FIG. 13.

As shown in FIGS. 11, 13-15, the damping panel 1090 include a melting sheet 1076 and a damping material fixing panel 1026. The melting sheet 1076 is attached to the longitudinal wall 1011 of the dashboard lower section 1010. The melting sheet 1076 is sandwiched between the damping material fixing panel 1026 and the dashboard lower section 1010.

The damping material fixing panel 1026 is configured so that a pressing operation is performed on a planar metallic component, thereby forming an irregular surface. The damping material fixing panel 1026 includes a panel main body 1101 and a bead part 1102. The panel main body 1101 is formed so as to cover an area surrounding the opening part 1086 for installing a piping of the longitudinal wall 1011 of the dashboard lower section 1010. The panel main body 1101 also covers the entire lower part of the opening part 1086 for installing a piping. The bead part 1102 is integrally formed at the right side of the panel main body 1101.

(Panel Main Body)

A piping installment surface 1103 is formed on a portion of the panel main body 1101 corresponding to an opening part 1086 for installing a piping. The air conditioning piping 1086*a* (see FIG. 13) is installed on the piping installment surface 1103. The piping installment surface 1103 slightly protrudes towards the dashboard lower section 1010 side (frontal side). As a result, the piping installment surface 1103 comes in contact with the peripheral of the opening part 1086 for installing a piping.

Furthermore, an opening part 1104 is formed on the piping installment surface 1103. The opening part 1104 is formed to be slightly larger than the opening part 1086 for installing a piping. The opening part 1086 for installing a piping is exposed through this opening part 1104.

Furthermore, a cut out part 1072 is formed to a left side of the piping installment surface 1103 of the panel main body 1101. The cut out part 1072 is formed at a portion corresponding to the boot attachment surface 1081 of the dashboard lower section 1010. The boot attachment surface 1081 is exposed through this cut out part 1072. The lower side of the boot attachment surface 1081 contacts a lower rim of the cut out part 1072 of the panel main body 1101.

in addition, a panel flange part 1101*a* is formed at an upper part compared to the piping installment surface 1103 of the panel main body 1101. The panel flange part 1101*a* is formed along the bent section 1027 of the dashboard lower section 1010. The panel flange part 1101*a* is configured so as to bend and extend towards a rear direction towards the cut out part 1072 side. Further, a left side of the panel flange part 1101*a* (the cut out part 1072 side) is overlapped with the bent section 1027 of the dashboard lower section 1010.

A small bead 1115 extends at a lower part of this overlapping portion. The small bead 1115 is used to reinforce the panel main body 1101. The small bead 1115 is provided along the longitudinal wall 1011 of the dashboard lower section 1010 and along the upper-lower direction. Furthermore, the small bead 1115 is formed at an area between the panel flange part 1101*a* to an area near the piping installment surface 1103 of the panel main body 1101.

Here, a portion at which the left side of the panel flange part 1101*a* (the cut out part 1072 side) and the bent section 1027 of the dashboard lower section 1010 overlap is welded together by spot-welding.

Meanwhile, a sheet installment part 1105 is set to be an area lower than the piping installment surface 1103 of the panel main body 1101 and the cut out part 1072. The melting sheet 1076 is sandwiched between this sheet installment part 1105 and the dashboard lower section 1010.

A hole 1106 for setting is formed at a central part of the sheet installment part 1105. Another hole 1106 for setting is formed at an upper left side of the sheet installment part 1105. These holes 1106 for setting is used to determine the position of the melting sheet 1076. The holes 1106 for setting is formed so as to protrude towards a dashboard lower section 1010 side. On the other hand, a fitting hole (not diagrammed) is formed on the melting sheet 1076 at a position corresponding to the hole 1106 for setting. As a result of this fitting hole fitting with the hole 1106 for setting, the melting sheet 1076 is latched to the damping material fixing panel 1026. In this way, the position of the melting sheet 1076 is determined.

Further, a sheet recognition surface 1107 is formed at a right side of the sheet installment part 1105. The sheet recognition surface 1107 protrudes towards a cabin 1003 side. The sheet recognition surface 1107 is used to determine how the melting sheet 1076 is attached. A sheet existence or non-existence determination hole 1108 and a sheet slippage determination hole 1109 are formed on the sheet recognition surface 1107. These determination holes 1108, 1109 are placed close together.

The sheet existence or nonexistence determination hole 1108 is used to determine whether the melting sheet 1076 exists between the dashboard lower section 1010 and the sheet installment part 1105 of the damping material fixing panel 1026. Meanwhile, the sheet slippage determination hole 1109 is used to determine whether or not the melting sheet 1076 is placed at a predetermined position. In other words, the sheet slippage determination hole 1109 is used to determine whether or not the melting sheet 1076 has slipped. A sheet hole (not diagrammed) is formed at a position corresponding to the sheet slippage determination hole 1109 of the melting sheet 1076. The diameter of the sheet hole is set to be approximately the same as the diameter of the sheet slippage determination hole 1109.

(Bead Part)

The bead part 1102 is formed so as to extend from approximately a central portion in the upper-lower direction at a right side of the panel main body 1101 of the damping material fixing panel 1026 to the bent section 1027 of the dashboard lower section 1010.

Here, as shown in FIG. 14, the bead part 1102 includes a curved part 1102*a*. The curved part 1102*a* is formed to curve more gradually compared to the shape of the curved part 1010*a* of a component of the dashboard lower section 1010 corresponding to the bead part 1102. In this way, a space is formed between the dashboard lower section 1010 and the bead part 1102, due to the difference between the curvature of the curved part 1010*a* of the dashboard lower section 1010 and the curvature of the curved part 1102*a* of the bead part 1102. In other words, a closed cross sectional structure 1112 is formed between the dashboard lower section 1010 and the bead part 1102.

Furthermore, two upper and lower beads 1111, 1112 are formed on the bead part 1102. The two upper and lower beads 1111, 1112 extend throughout this bead part 1102 in the upper-lower direction. In other words, each of the upper and lower beads 1111, 1112 is integrally formed by a perpendicular bead 1111*a*, 1112*a* and a curved bead 1111*b*, 11112*b*. The perpendicular bead 1111*a*, 1112*a* extend from a lower end of the bead part 1102 towards the upper direction in the orthogonal direction. The curved bead 1111*b*, 1112*b* is formed so as to curve from an upper end of the perpendicular bead 1111*a*, 1112*a* to a curved part 1102*a* of the bead part 1102. Further, the two upper and lower beads 1111, 1112 are formed to the right side of the opening part 1086 for installing a piping formed on the dashboard lower section 1010.

Each of the curved beads 1111*b*, 1112*b* are formed so as to curve along the curved part 1102*a* of the bead part 1102. Therefore, the shape of the curved beads 1111*b*, 1112*b* is curved more gradually compared to the shape of the curved part 1010*a* of the dashboard lower section 1010. Among these curved beads 1111*b*, 1112*b*, the curved bead 1112 is connected smoothly with the panel flange part 1101*a* via the connection part 1113. The curved bead 1112 is formed at the panel main body 1101 side. The panel flange part 1101*a* is formed on the panel main body 1101.

A planar bead flange part 1114 is formed at an area above the connection part 1113 of the bead part 1102. The planar bead flange part 1114 extends along the bent section 1027 of the dashboard lower section 1010. This bead flange part 1114 overlaps with the bent section 1027. The bead flange part 1114 is spot-welded to the bent section 1027.

Incidentally, the bead flange part 1114 is formed to extend in a planar manner. However, it is possible to extend the upper end of the upper and lower beads 1111, 1112 towards the tip of the bead flange part 1114. Further, a plurality of beads may be formed on the bead flange part 1114 separate from the upper and lower beads 1111, 1112.

By forming the damping material fixing panel 1026 in this way, the spot-welding point 1000M of the right side front side frame 1004*b* is set below the bead part 1102 of the damping material fixing panel 1026 of the dashboard lower section 1010. (See FIGS. 11, 14.)

Further, the spot-welding point 1000M of the left side front side frame 1004*a* is set below the master cylinder stiffener 1025. This master cylinder stiffener 1025 is attached opposite to the damping material fixing panel 1026, with the center frame 1028 of the dashboard lower section 1010 being interposed in between.

(Effects)

Therefore, according to the second embodiment described above, each of the upper and lower beads 1111, 1112 are formed on the bead part 1102 included in the damping material fixing panel 1026. The upper bead 1111 include a perpendicular bead 1111*a* and a curved bead 1111*b*. Meanwhile, the lower bead 1112 include a perpendicular bead 1112*a* and a curved bead 1112*b*. The shape of the curved beads 1111*b*, 1112*b* is curved more gradually than the shape of the curved part 1010*a* of the dashboard lower section 1010. Therefore, the bead part 1102 may restrain the bending and deformation of the curved part 1010*a* of the dashboard lower section 1010. Furthermore, due to the difference between the curvature of the curved part 1010*a* of the dashboard lower section 1010 and the curvature of the curved part 1102*a* of the bead part 1102, a closed cross sectional structure 1112 is formed between the dashboard lower section 1010 and the bead part 1102. Therefore, even if the damping material fixing panel 1026 and the melting sheet 1076 are thinned, a robust structure can be obtained, adequate to restrain the membrane oscillation. Thus, it is possible to reduce the material cost and the weight of the damping material fixing panel 1026 and the melting sheet 1076.

Furthermore, by continuously forming the perpendicular bead 1111*a*, 1112*a* and the curved bead 1111*b*, 1112*b*, it is possible to enhance the efficiency with which the rigidity of the dashboard lower section 1010 is enhanced by the damping material fixing panel 1026.

Furthermore, the bead part 1102 is formed at the right side of the panel main body 1101 of the damping material fixing panel 1026. In addition, the bead part 1102 is formed so as to extend from approximately a central portion in the upper-lower direction at a right side of the panel main body 1101 of the damping material fixing panel 1026 to the bent section 1027 of the dashboard lower section 1010. Therefore, it is possible to enhance the rigidity of the bent section 1027 of the dashboard lower section 1010, an area near the portion connecting the bent section 1027 and the longitudinal wall 1011, and the curved part 1010*a*. Furthermore, it is possible to prevent these components from deforming.

In addition, a piping installment surface 1103 is formed on a portion of the panel main body 1101 of the damping material fixing panel 1026 corresponding to an opening part 1086 for installing a piping. The air conditioning piping 1086*a* is installed on the piping installment surface 1103. The piping installment surface 1103 slightly protrudes towards the dashboard lower section 1010 side. Furthermore, the upper and lower beads 1111, 1112 are formed to the right side of the opening part 1086 for installing a piping of the dashboard lower section. Therefore, even if the opening part 1086 for installing a piping is formed on the dashboard lower section, it is possible to form the upper and lower beads 1111, 1112 so that the beads 1111, 1112 are elongated in the upper-lower direction. Since the beads 1111, 1112 can be elongated in this way, the rigidity of the dashboard lower section 1010 may be enhanced.

In addition, the spot-welding point 1000M of the right side front side frame 1004b is set below the bead part 1102 of the damping material fixing panel 1026 of the dashboard lower section 1010. In other words, the rear end of the right front side frame 1004b is welded to a portion of the dashboard lower section 1010 that is reinforced by welding the damping material fixing panel 1026. Therefore, it is possible to enhance the supporting rigidity of the rear end of the right front side frame 1004b.

Meanwhile, the spot-welding point 1000M of the left side front side frame 1004a is set at a portion of the dashboard lower section 1010 below the master cylinder stiffener 1025. By welding the master cylinder stiffener 1025 in this way, it is possible to enhance the supporting rigidity of an area below the master cylinder stiffener 1025, which is an area at which the rear end of the left front side frame 1004a is welded.

While a preferred embodiment of the present invention has been described above, it should be understood that these are exemplary of the invention and are not to be considered as limiting the present invention. Additions, omissions, substitutions, and other modifications can be made without departing from the scope of the present invention.

For example, in the second embodiment described above, two upper and lower beads 1111, 1112 were formed on the bead part 1102 included in the damping material fixing panel 1026. However, the present invention is not limited by this configuration. Three or more upper and lower beads may be formed. On the other hand, only one bead may be formed as well.

In addition, according to the above embodiment, an instance was described in which metallic welding of various components was made by spot-welding. However, the present invention is not limited to this embodiment. A known metallic welding method such as arc welding like TIG (Tungsten Inert Gas) welding, MIG (Metallic Inert Gas) welding, and plasma welding; laser welding; and electron beam welding may be used as well, as appropriate.

Moreover, in the embodiment described above, a bent section 1027 is formed at an upper rim of the longitudinal wall 1011 of the dashboard lower section 1010. The bent section 1027 bends and extends towards a rear direction. However, as long as the bent section 1027 bends and extends in the front-rear direction, the bent section 1027 may be configured to bend and extend from the upper rim of the longitudinal wall 1011 towards a frontal direction.

(Frontal Structure of Vehicle)
(Dashboard Lower Section)

Hereunder, a third embodiment of a frontal structure of a vehicle according to an aspect of the present invention is described with reference to the drawings. In the following description, a frontal direction in which the vehicle is moving may be simply referred to as a "frontal direction," a rear direction which is opposite to the direction in which the vehicle is moving may be simply referred to as a "rear direction," a direction to the right in the vehicle width direction may be simply referred to as a "right direction," a direction to the left in the vehicle width direction may be simply referred to as a "left direction," an upward direction which is opposite to the direction of the gravitational force may be simply referred to as an "upper direction," and a lower direction which corresponds to the direction of the gravitational force applies may be simply referred to as a "lower direction."

Figure 16:
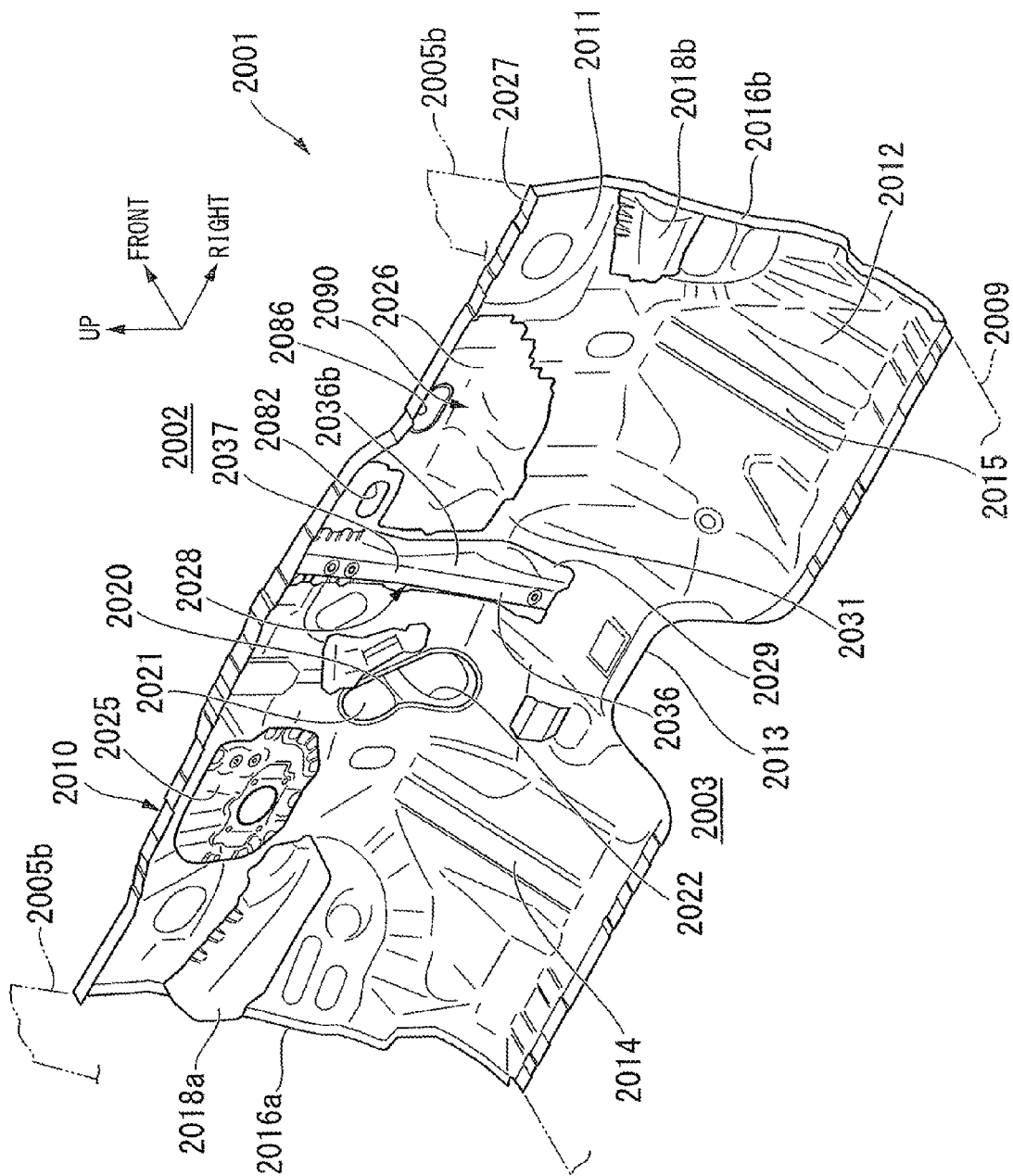
FIG. 16 is a perspective view of a dashboard lower section according to a third embodiment of the present invention seen from a cabin side.
Figure 17:
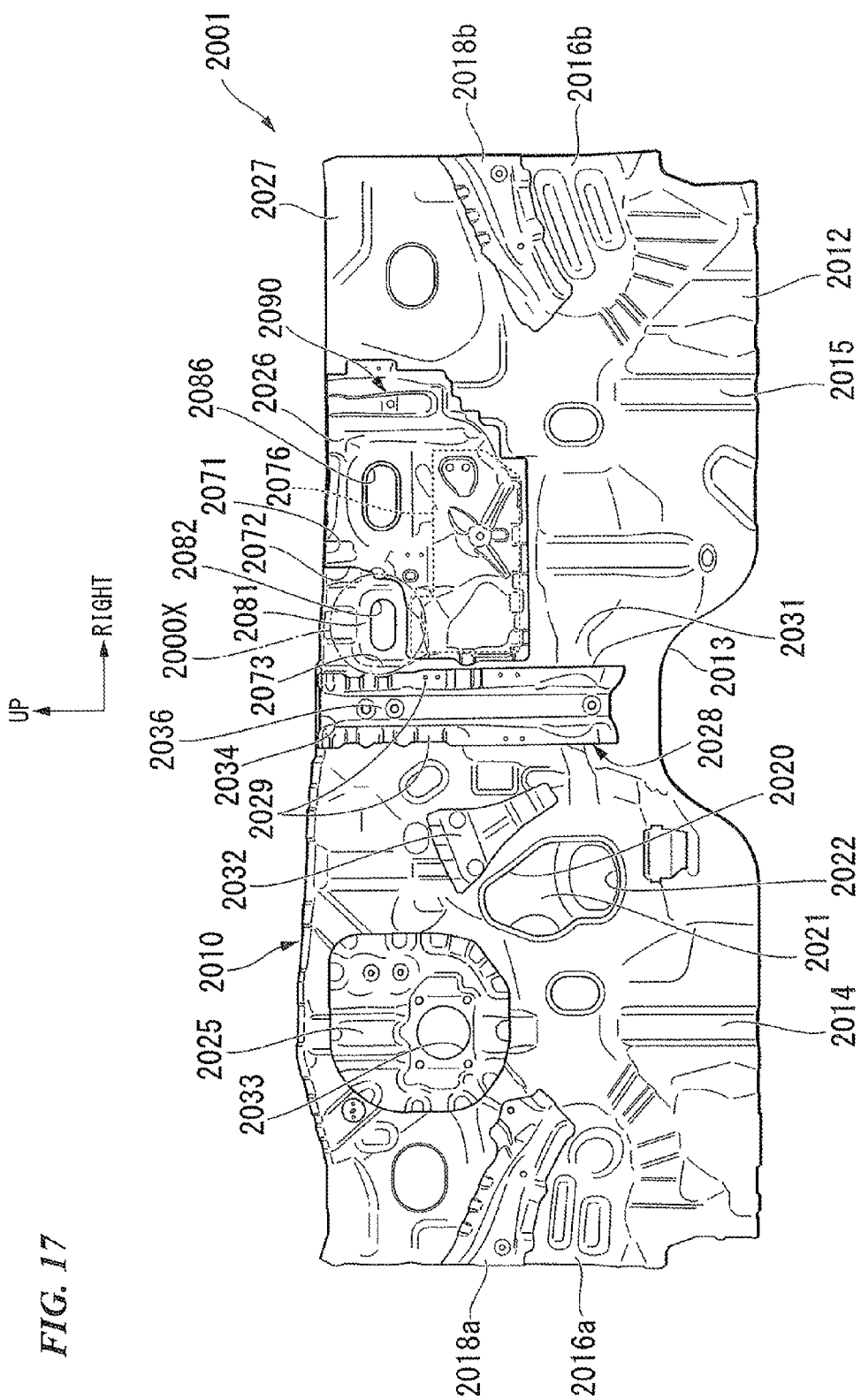
FIG. 17 is a planar view of a dashboard lower section according to a third embodiment of the present invention seen from a cabin side.

FIG. 16 is a perspective view of a dashboard lower section seen from a cabin side. FIG. 17 is a planar view of a dashboard lower section seen from a cabin side.

As shown in FIGS. 16-17, a vehicle frontal structure 2001 includes an engine room 2002, a cabin 2003 placed behind the engine room 2002, a dashboard lower section 2010 separating the engine room 2002 and the cabin 2003, a pair of front pillars 2005a, 2005b placed on both the left and right sides of the dashboard lower section 2010 and elongating in an upper-lower direction, and a floor panel 2009 welded to a lower rim of the dashboard lower section 2010.

The dashboard lower section 2010 is formed by applying a pressing operation to a planar metallic component. The dashboard lower section 2010 includes a longitudinal wall 2011 and a tilted wall 2012. The longitudinal wall 2011 is positioned along an upper-lower direction. The tilted wall 2012 is extended as a descending slope from a lower portion of the longitudinal wall 2011 in a rear direction. A wheel housing part 2016a is provided at the left side, and a wheel housing part 2016b is provided at the right side.

Each of the wheel housing parts 2016a, 2016b is formed so as to expand towards a cabin 2003 side. Gazettes 2018a, 2018b are provided respectively at the upper portions of the wheel housing parts 2016a, 2016b.

A front side frame (not diagrammed) is spot-welded to the central end part, with respect to the vehicle width direction, of each of the gazettes 2018a, 2018b. The front side frame is provided at a front side, with the dashboard lower section 2010 provided in between. On the other hand, the front pillar 2005a is spot-welded to an outer side end part, with respect to the vehicle width direction, of the gazette 2018a. Further, the front pillar 2005b is spot-welded to an outer side end part, with respect to the vehicle width direction, of the gazette 2018b.

A bent section 2027 is formed at an upper rim of the longitudinal wall 2011 of the dashboard lower section 2010. The bent section 2027 bends and extends towards the rear direction. A plurality of beads 2049 are formed on the bent section 2027 along the front-rear direction. The beads 2049 protrude upwards, and are placed along the longitudinal direction of the bent section 2027.

On the other hand, a tunnel part 2013 is integrally to a central section, with respect to the vehicle width direction, of the tilted wall 2012. The tunnel part 2013 expands upwards. A driver-seat-side step part 2014 is positioned to the left of the tunnel part 2013. A passenger-seat-side step part 2015 is positioned to the right of the tunnel part 2013. The tunnel part 2013 is placed between the driver-seat-side step part 2014 and the passenger-seat-side step part 2015.

Further, a center frame 2028 is provided between the bent section 2027 of the longitudinal wall 2011 and the tunnel part 2013. The center frame 2028 extends in the upper-lower direction. This center frame 2028 is a reinforcing member that enhances the rigidity of the dashboard lower section 2010. The center frame 2028 is configured by a frame main body 2036 and a flange part 2029. The frame main body 2036 is formed so that the cross section is shaped approximately like the letter U. The flange part 2029 bends and extends from both side rimes of the frame main body 2036 towards an outer side. The center frame 2028 is fixed so that an opening side faces the longitudinal wall 2011 side. Thus, a closed cross section structure is formed between the longitudinal wall 2011 and the center frame 2028.

An upper end flange part 2034a is formed at an upper end of the center frame 2028. The upper end flange part 2034a bends and extends towards a rear direction so as to overlap with the bent section 2027 of the longitudinal wall 2011. This upper end flange part 2034a and the bent section 2027 are overlapped with one another and are welded by spot-welding. In this way, a closed cross section structure is formed between the center frame 2028 and the bent section 2027.

An opening part 2020 for a steering wheel is formed at a boundary part of the driver-seat-side step part 2014 between the longitudinal wall 2011 and the tilted wall 2012. The opening part 2020 for the steering wheel connects the engine room 2002 and the cabin 2003. A steering shaft (not diagrammed) is inserted in the opening part 2020 for the steering wheel. A steering joint cover 2021 is attached to the opening part 2020 for the steering wheel from the engine room 2002 side. The steering joint cover 2021 covers the opening part 2020 for the steering wheel.

The steering joint cover 2021 is shaped as a cup. The steering joint cover 2021 is formed so as to bulge towards the engine room 2002 side. A joint insertion opening 2022 is formed on the steering joint cover 2021. The joint insertion opening 2022 is used to insert a steering shaft (not diagrammed) and a universal joint connected to the steering shaft.

Furthermore, at a surface at an engine room 2002 side of the dashboard lower section 2010, a dashboard cross member (not diagrammed) is provided at a position corresponding to the steering joint cover 2021. This dashboard cross member is configured to be divided by the steering joint cover 2021 into left and right sides. The left and right cross members are connected via this steering joint cover 2021.

Here, a concaved part 2031 is formed at a surface of the dashboard lower section 2010 at a cabin 2003 side at a component corresponding to the right side cross member (not diagrammed). The concaved part 2031 is elongated in the left-right direction. The concaved part 2031 is formed by bulging the dashboard lower section 2010 towards an engine room 2002 side. In this way, it is possible to further enhance the rigidity of a component of the dashboard lower section 2010 corresponding to the dashboard cross member.

Further, an acceleration pedal bracket 2032 is provided on a surface of the longitudinal wall 2011 of the dashboard lower section 2010 at the cabin 2003 side. The acceleration pedal bracket 2032 is used to assemble an acceleration pedal (not diagrammed). This acceleration pedal bracket 2032 is provided at an upper right side of the opening part 2020 for the steering wheel. Further, an installation hole 2033 is provided on the longitudinal wall 2011. The installation hole 2033 is used to install a brake master cylinder (not diagrammed). This installation hole 2033 is placed at an upper left side of the opening part 2020 for the steering wheel.

A master cylinder stiffener 2025 is provided on a surface of the longitudinal wall 2011 at a cabin 2003 side. The position of the master cylinder stiffener 2025 corresponds to the installation hole 2033. The master cylinder stiffener 2025 is configured so that a pressing operation is performed on a planar metallic component, thereby forming an irregular surface. A brake master cylinder (not diagrammed) is fixed to this master cylinder stiffener 2025.

Further, an opening part 2082 for an air conditioner is formed at an upper portion of the longitudinal wall 2011. The opening part 2082 for an air conditioner is formed to the right side of the center frame 2028. In addition, an opening part 2086 for installing a piping is formed to the right side of the opening part 2082 for an air conditioner. An air conditioning piping of an air conditioning unit (not diagrammed) passes through the opening part 2082 for an air conditioner. A boot attachment surface 2081 is an area surrounding a portion of the dashboard lower section 2010 at which the opening part 2082 for an air conditioner is formed. The boot attachment surface 2081 is formed so as to protrude towards the cabin 2003 side. An air conditioning boot (not diagrammed) is attached to the boot attachment surface 2081. The air conditioning boot ensures that the opening part 2082 for an air conditioner is sealed.

Further, a dashboard bead 2083 is formed between the boot attachment surface 2081 and the bent section 2027. The dashboard bead 2083 bridges the boot attachment surface 2081 and the bent section 2027. The dashboard bead 2083 is configured as a two-step bead. The height of the protrusion of the dashboard bead 2083 becomes higher towards a central part in the left-right direction due to the steps. The ridge line 2049a of the bead 2049 of the bent section 2027 is formed to be continuous with the ridge line 2083a of the dashboard bead 2083. In addition, a damping panel 2090 is connected to a surface of the longitudinal wall 2011 at the cabin 2003 side. The damping panel 2090 is placed near the right side of the center frame 2028.

(Damping Panel)
(Damping Material Fixing Panel)

Figure 18:
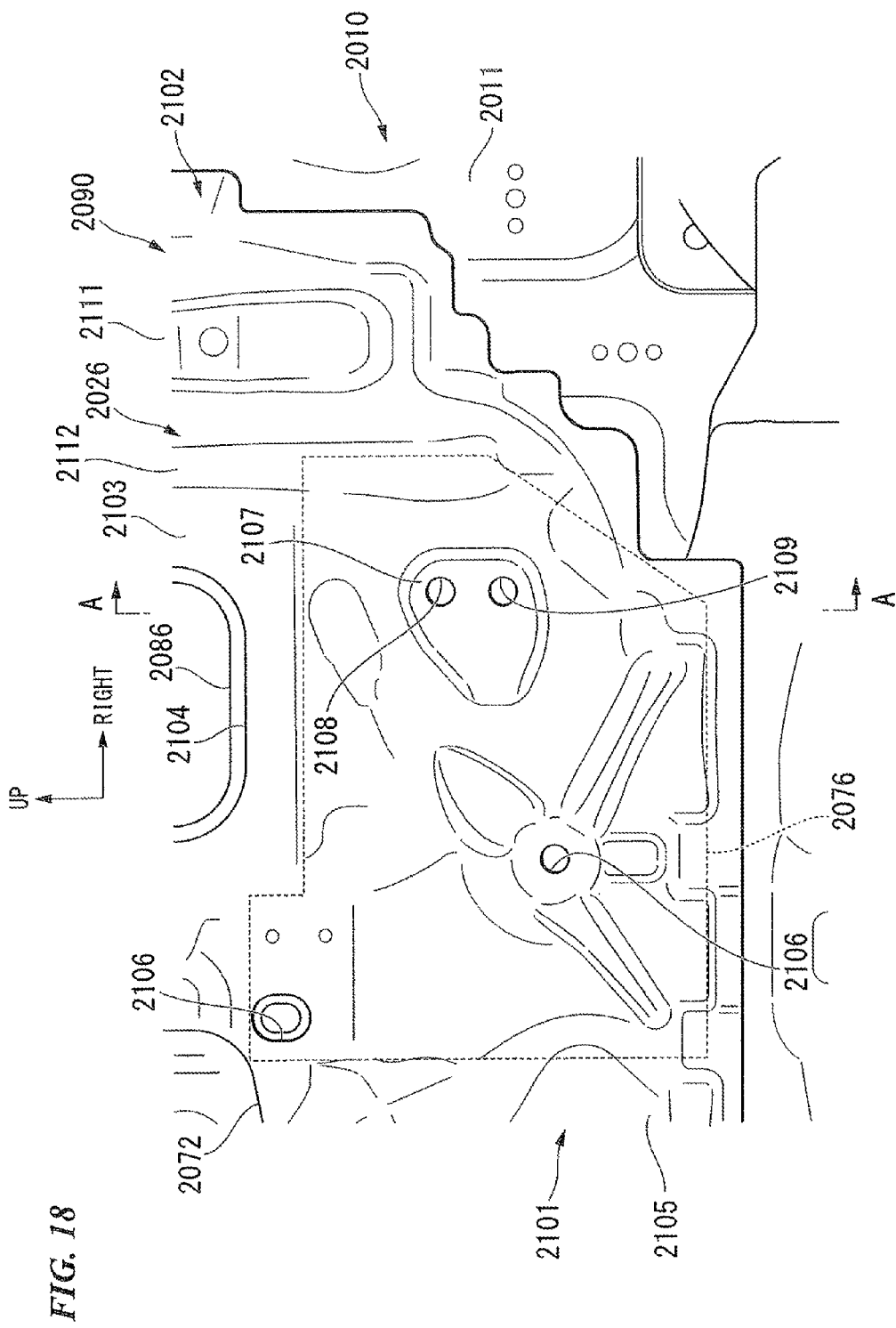
FIG. 18 is a planar view of a damping panel according to a third embodiment of the present invention.
Figure 19:
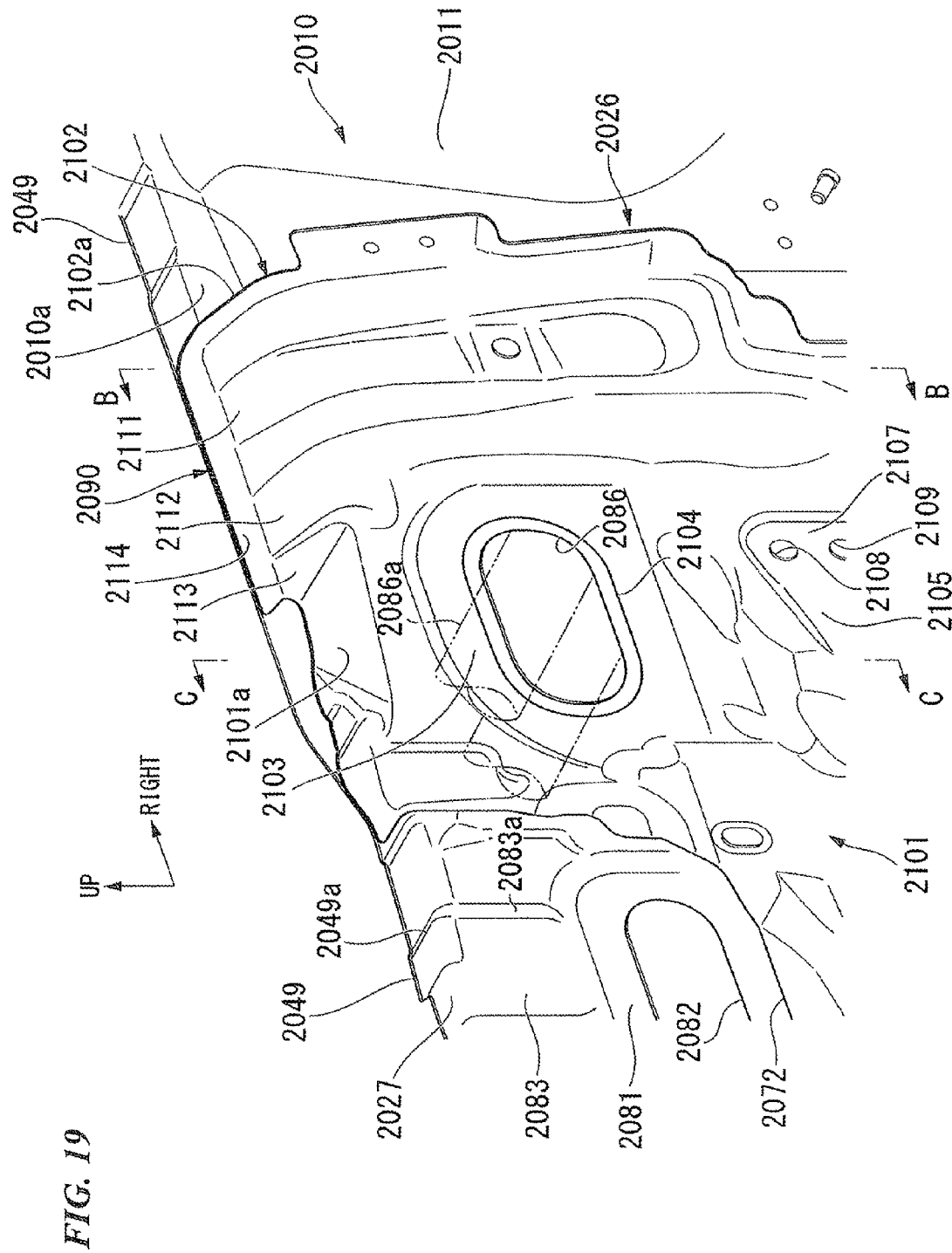
FIG. 19 is a perspective view of a main part of a damping panel according to a third embodiment of the present invention.
Figure 20:
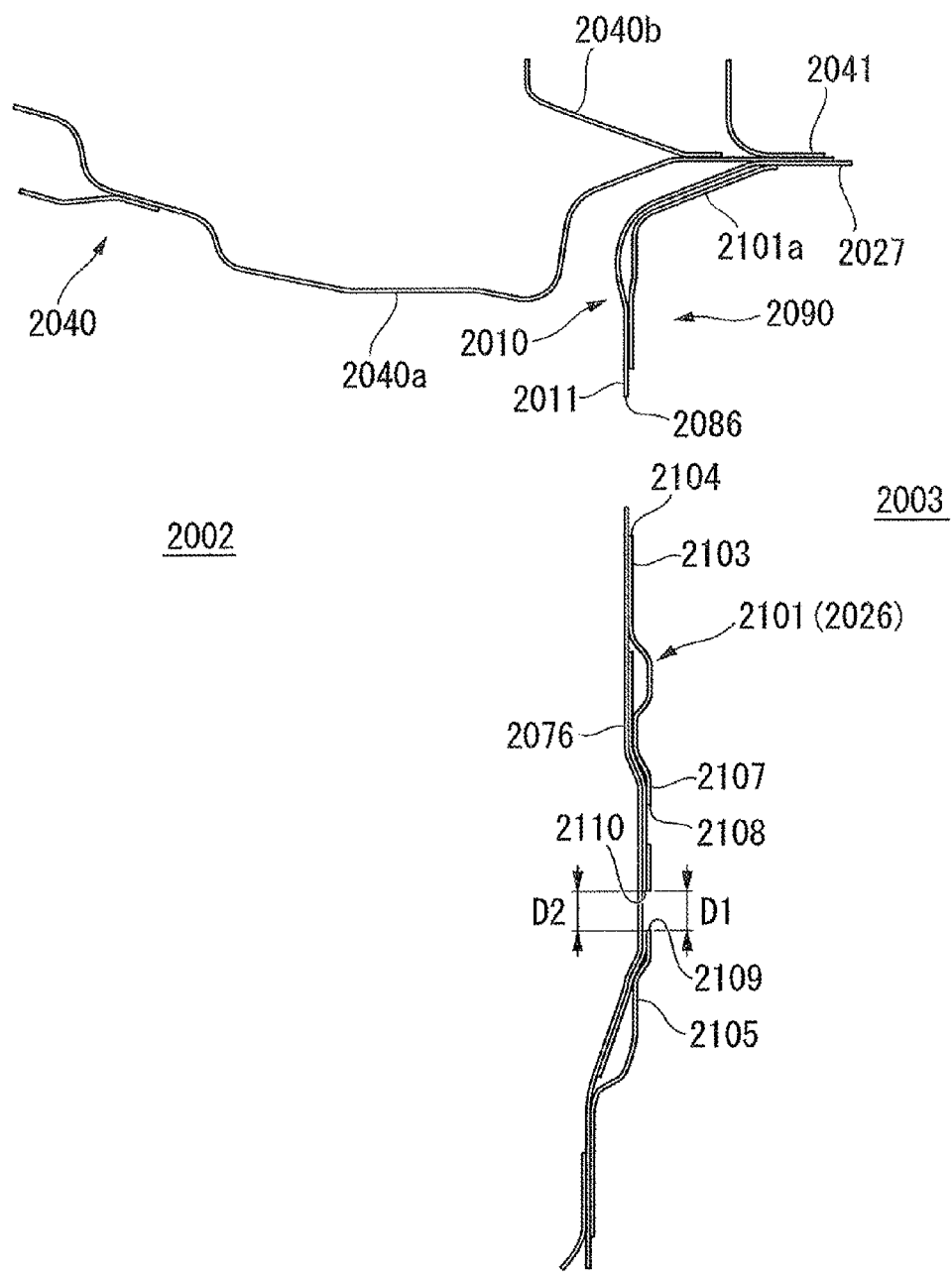
FIG. 20 is a cross sectional view along line A-A of FIG. 18.
Figure 21:
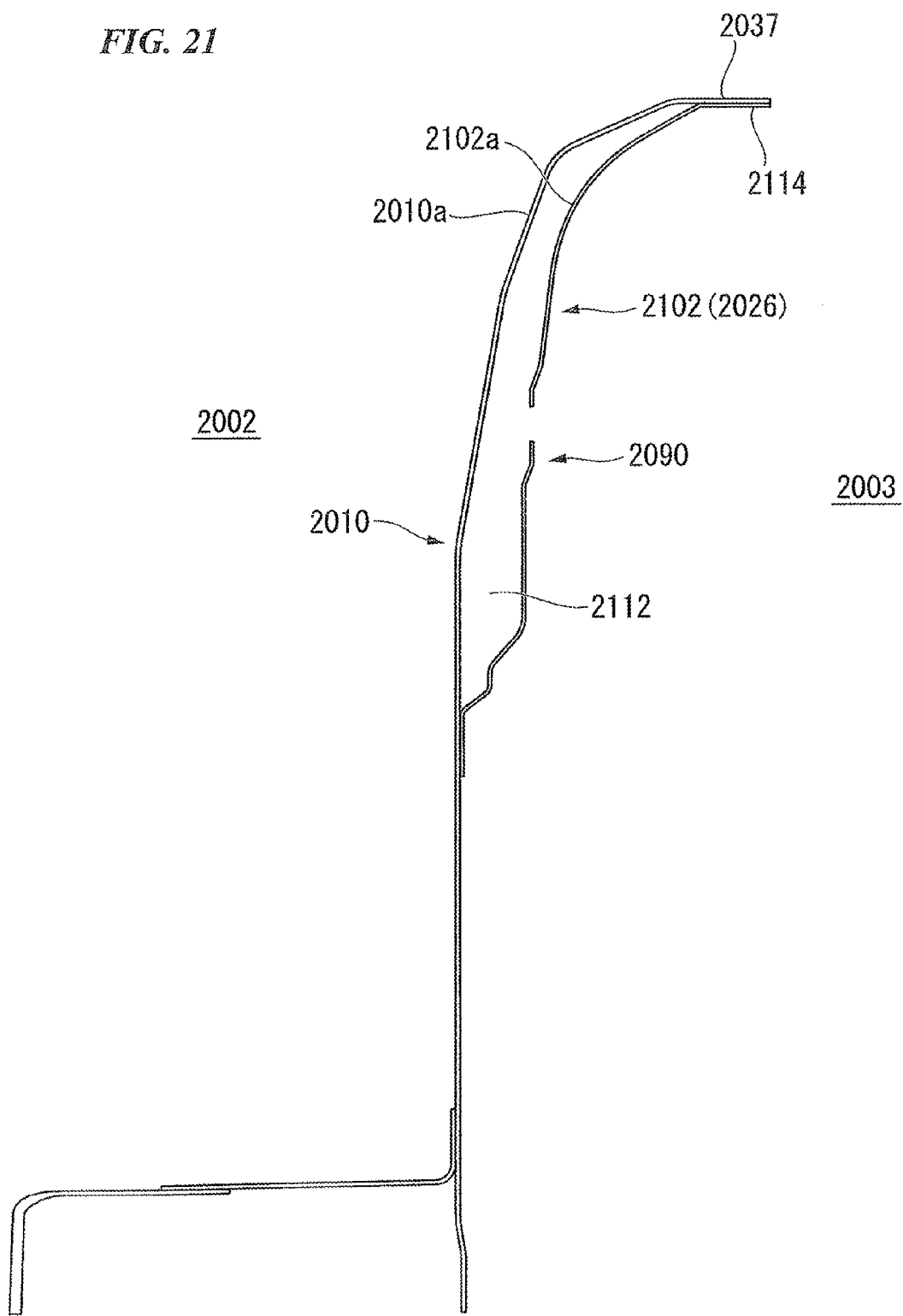
FIG. 21 is a cross sectional view along line B-B of FIG. 19.

FIG. 18 is a planar view of a damping panel. FIG. 19 is a perspective view of a damping panel, and shows an area near the opening part for installing a piping. FIG. 20 is a cross sectional view along line A-A in FIG. 18. FIG. 21 is a cross sectional view along line B-B in FIG. 19. FIG. 22 is a cross sectional view along line C-C in FIG. 19.

As shown in FIGS. 18-22, the damping panel 2090 includes a melting sheet 2076 and a damping material fixing panel 2026. The melting sheet 2076 is attached to the longitudinal wall 2011 of the dashboard lower section 2010. The melting sheet 2076 is sandwiched between the damping material fixing panel 2026 and the dashboard lower section 2010.

The damping material fixing panel 2026 is configured so that a pressing operation is performed on a planar metallic component, thereby forming an irregular surface. The damping material fixing panel 2026 includes a panel main body 2101 and a bead part 2102. The panel main body 2101 is formed so as to cover an area surrounding the opening part 2086 for installing a piping of the longitudinal wall 2011 of the dashboard lower section 2010. The panel main body 2101 also covers the entire lower part of the opening part 2086 for installing a piping. The bead part 2102 is integrally formed at the right side of the panel main body 2101.

(Panel Main Body)

A piping installment surface 2103 is formed on a portion of the panel main body 2101 corresponding to an opening part 2086 for installing a piping. The air conditioning piping 2086a (see FIG. 19) is installed on the piping installment surface 2103. The piping installment surface 2103 slightly protrudes towards the dashboard lower section 2010 side (frontal side). As a result, the piping installment surface 2103 comes in contact with the peripheral of the opening part 2086 for installing a piping.

Furthermore, an opening part 2104 is formed on the piping installment surface 2103. The opening part 2104 is formed to be slightly larger than the opening part 2086 for installing a piping. The opening part 2086 for installing a piping is exposed through this opening part 2104.

Furthermore, a cut out part 2072 is formed to a left side of the piping installment surface 2103 of the panel main body 2101. The cut out part 2072 is formed at a portion corresponding to the boot attachment surface 2081 of the dashboard lower section 2010. The boot attachment surface 2081 is exposed through this cut out part 2072. The lower side of the boot attachment surface 2081 contacts a lower rim of the cut out part 2072 of the panel main body 2101.

In addition, a panel flange part 2101*a* is formed above the piping installment surface 2103 of the panel main body 2101. The panel flange part 2101*a* is formed along the bent section 2027 of the dashboard lower section 2010. The panel flange part 2101*a* is configured so as to bend and extend towards a rear direction towards the cut out part 2072 side. Further, a left side of the panel flange part 2101*a* (the cut out part 2072 side) is overlapped with the bent section 2027 of the dashboard lower section 2010. Here, a portion at which the left side of the panel flange part 2101*a* (the cut out part 2072 side) and the bent section 2027 of the dashboard lower section 2010 overlap is welded together by spot-welding.

Meanwhile, a sheet installment part 2105 is set to be an area lower than the piping installment surface 2103 of the panel main body 2101 and the cut out part 2072. The melting sheet 2076 is sandwiched between this sheet installment part 2105 and the dashboard lower section 2010.

A hole 2106 for setting is formed at a central part of the sheet installment part 2105. Another hole 2106 for setting is formed at an upper left side of the sheet installment part 2105. The hole 2106 for setting is used to determine the position of the melting sheet 2076. The hole 2106 for setting is formed so as to protrude towards a dashboard lower section 2010 side. On the other hand, a fitting hole (not diagrammed) is formed on the melting sheet 2076 at a position corresponding to the hole 2106 for setting. As a result of this fitting hole fitting with the hole 2106 for setting, the melting sheet 2076 is latched to the damping material fixing panel 2026. In this way, the position of the melting sheet 2076 is determined.

Further, a sheet recognition surface 2107 is formed at a right side of the sheet installment part 2105. The sheet recognition surface 2107 protrudes towards a cabin 2003 side. The sheet recognition surface 2107 is used to determine how the melting sheet 2076 is attached. A sheet existence or nonexistence determination hole 2108 and a sheet slippage determination hole 2109 are formed on the sheet recognition surface 2107. These determination holes 2108, 2109 are placed close together.

The sheet existence or nonexistence determination hole 2108 is used to determine whether the melting sheet 2076 exists between the dashboard lower section 2010 and the sheet installment part 2105 of the damping material fixing panel 2026.

Meanwhile, the sheet slippage determination hole 2109 is used to determine whether or not the melting sheet 2076 is placed at a predetermined position. In other words, the sheet slippage determination hole 2109 is used to determine whether or not the melting sheet 2076 has slipped. A sheet hole 2110 is formed at a position corresponding to the sheet slippage determination hole 2109 of the melting sheet 2076. The diameter D2002 of the sheet hole 2110 is set to be approximately the same as the diameter D2001 of the sheet slippage determination hole 2109.

(Bead Part)

The bead part 2102 is formed so as to extend from approximately a central portion in the upper-lower direction at a right side of the panel main body 2101 of the damping material fixing panel 2026 to the bent section 2027 of the dashboard lower section 2010.

Here, as shown in FIG. 21, the bead part 2102 includes a curved part 2102*a*. The curved part 2102*a* is formed to curve more gradually compared to the shape of the curved part 2010*a* of a component of the dashboard lower section 2010 corresponding to the bead part 2102. In this way, a closed cross sectional structure 2116 is formed between the dashboard lower section 2010 and the bead part 2102.

Furthermore, two upper and lower beads 2111, 2112 are formed on the bead part 2102. The two upper and lower beads 2111, 2112 extend throughout this bead part 2102 in the upper-lower direction. In other words, the two upper and lower beads 2111, 2112 are formed to the right side of the opening part 2086 for installing a piping formed on the dashboard lower section 2010. Among these curved beads 2111*b*, 2112*b*, an upper portion of the upper and lower bead 2112 formed at the panel main body 2101 side is smoothly connected to the panel flange part 2101*a* via the connection part 2113. The panel flange part 2101*a* is formed on the panel main body 2101.

A planar bead flange part 2114 is formed at an area above the connection part 2113 of the bead part 2102. The planar bead flange part 2114 extends along the bent section 2027 of the dashboard lower section 2010. This bead flange part 2114 overlaps with the bent section 2027. The bead flange part 2114 is spot-welded to the bent section 2027.

Incidentally, the bead flange part 2114 is formed to extend in a planar manner. However, it is possible to extend the upper end of the upper and lower beads 2111, 2112 towards the tip of the bead flange part 2114. Further, a plurality of beads may be formed on the bead flange part 2114 separate from the upper and lower beads 2111, 2112.

Incidentally, as shown in FIG. 20, the bent section 2027 of the dashboard lower section 2010 is spot-welded to the flange part 2041 formed in the peripheral of the dashboard upper assembly 2040. The dashboard upper assembly 2040 includes a lower panel 2040*a* and an upper panel 2040*b*. The lower panel 2040*a* and the upper panel 2040*b* are stacked together on top of each other. The lower panel 2040*a* and the upper panel 2040*b* are formed by applying a pressing operation on a planar metallic component. A closed cross sectional structure is formed by these lower panel 2040*a* and the upper panel 2040*b*.

(A Method to Determine how the Melting Sheet is Attached)

Figure 23A:
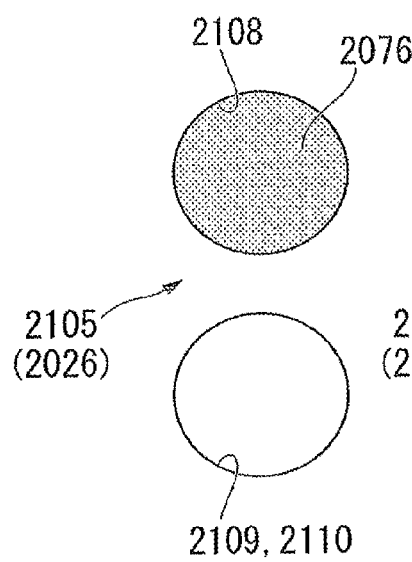
FIG. 23A is a descriptive view of a melting sheet according to a third embodiment of the present invention, showing a normal condition.
Figure 23B:
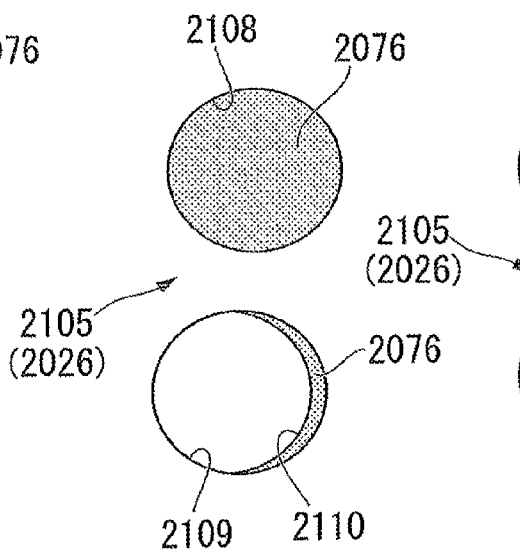
FIG. 23B is a descriptive view of a melting sheet according to a third embodiment of the present invention, showing a condition in which a melting sheet has slipped.
Figure 23C:
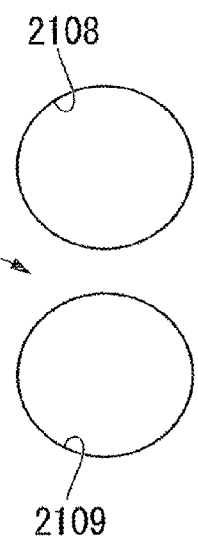
FIG. 23C is a descriptive view of a melting sheet according to a third embodiment of the present invention, showing a condition in which a melting sheet does not exist.

Next, with reference to FIGS. 23A, 23B, and 23C, the following describes a method of determining whether or not the melting sheet 2076 is properly attached. The melting sheet 2076 is sandwiched between the dashboard lower section 2010 and the damping material fixing panel 2026.

FIGS. 23A, 23B, and 23C are descriptive views of the conditions of the melting sheet 2076. The melting sheet 2076 is seen from each of the determination holes 2108, 2109 formed on the panel main body 2101 of the damping material fixing panel 2026. FIG. 23A shows a normal condition. FIG. 23B shows a condition in which the melting sheet 2076 has slipped. FIG. 23C shows a condition in which the melting sheet 2076 does not exist.

First, as indicated in FIG. 23A, an instance is described such that the melting sheet 2076 is properly placed between the dashboard lower section 2010 and the sheet attachment surface 2105.

In this case, the melting sheet 2076 can be seen through a sheet existence or nonexistence determination hole 2108. Meanwhile, the melting sheet 2076 cannot be seen through a sheet slippage determination hole 2109. This is because the sheet slippage determination hole 2109 and a sheet hole 2110 of the melting sheet 2076 is overlapped.

Next, as indicated in FIG. 23B, a condition is described in which the melting sheet 2076 is sandwiched between the dashboard lower section 2010 and the sheet installment part 2105, but the position at which the melting sheet 2076 is attached is displaced.

In such a case, the melting sheet 2076 may be seen through the sheet existence or nonexistence determination hole 2108.

Meanwhile, the peripheral rim of the sheet hole 2110 of the melting sheet 2076 can be seen from the sheet slippage determination hole 2109. In other words, since the position of the sheet slippage determination hole 2109 is different from the position of the sheet hole 2110, it is possible to see that the melting sheet 2076 is displaced.

Next, as indicated in FIG. 23C, a condition is described in which the melting sheet 2076 does not exist between the dashboard lower section 2010 and the sheet installment part 2105, i.e., when one has forgotten to install the melting sheet 2076.

In such a case, the melting sheet 2076 cannot be seen from the sheet existence or nonexistence determination hole 2108 and the sheet slippage determination hole 2109. In this way, it is possible to determine that the melting sheet 2076 does not exist. In other words, it is possible to determine that one has forgotten to install the melting sheet 2076.

(Effect)

Therefore, according to the third embodiment described above, a sheet existence or nonexistence determination hole 2108 and a sheet slippage determination hole 2109 are formed on the panel main body 2101 of the damping material fixing panel 2026. The damping material fixing panel 2026 fixes the melting sheet 2076 by sandwiching the melting sheet 2076 between the damping material fixing panel 2026 and the longitudinal wall 2011 of the dashboard lower section 2010. Therefore, it is possible to determine, from outside the damping material fixing panel 2026, the condition in which the melting sheet 2076 is attached. (See FIGS. 23A, 23B, 23C.) Furthermore, since the determination holes 2108, 2109 are placed close together, it is possible to determine both the existence and nonexistence of the melting sheet 2076, and whether or not the melting sheet 2076 has been dislocated. Therefore, the melting sheet 2076 may be placed in a reliable manner without forgetting. At the same time, the melting sheet 2076 may be set to a predetermined position with reliability.

In addition, a sheet hole 2110 is formed at a position corresponding to the sheet slippage determination hole 2109 of the melting sheet 2076. The diameter D2002 of the sheet hole 2110 is set to be approximately the same as the diameter D2001 of the sheet slippage determination hole 2109. Therefore, as shown in FIG. 23A, when the melting sheet 2076 is properly placed between the dashboard lower section 2010 and the sheet installment part 2105, the melting sheet 2076 cannot be viewed through the sheet slippage determination hole 2109. Meanwhile, as shown in FIG. 23B, when the melting sheet 2076 has been dislocated, a peripheral rim of the sheet hole 2110 of the melting sheet 2076 may be viewed from the sheet slippage determination hole 2109. In this way, the slippage of the melting sheet 2076 may be determined easily.

In addition, the bead part 2102 of the damping material fixing panel 2026 includes a curved part 2102a. The curved part 2102a is formed to curve more gradually compared to the shape of the curved part 2010a of a component of the dashboard lower section 2010 corresponding to the bead part 2102. As a result, the bead part 2102 can prevent the curved part 2010a of the dashboard lower section 2010 from bending and deforming. At the same time, the upper and lower beads 2111, 2112 are formed on the bead part 2102. Therefore, the rigidity of the bead part 2102 can be enhanced. In this way, the damping material fixing panel 2026 can be made thinner, and the membrane oscillation of the dashboard lower section 2010 can be restrained.

Furthermore, the bent section 2027 is formed at an upper rim of the dashboard lower section 2010. At the same time, a bead flange part 2114 is formed on an upper part of the bead part 2102. The bead flange part 2114 extends along the bent section 2027. This bead flange part 2114 and the bent section 2027 are overlapped with one another, and are spot-welded. Therefore, the rigidity of the bent section 2027 may be enhanced. Moreover, the membrane oscillation of the dashboard lower section 2010 may be restrained.

In addition, a piping installment surface 2103 is formed on a portion of the panel main body 2101 of the damping material fixing panel 2026 corresponding to an opening part 2086 for installing a piping. The air conditioning piping 2086a is installed on the piping installment surface 2103. The piping installment surface 2103 slightly protrudes towards the dashboard lower section 2010 side. Furthermore, two upper and lower beads 2111, 2112 are formed to the right side of the opening part 2086 for installing a piping of the dashboard lower section 2010. Therefore, even if the opening part 2086 for installing a piping is formed on the dashboard lower section 2010, the upper and lower beads 2111, 2112 can be formed to be elongated in the upper-lower direction. Since the upper and lower beads 2111, 2112 can be elongated, the rigidity of the dashboard lower section 2010 can be further enhanced.

While a preferred embodiment of the present invention has been described above, it should be understood that these are exemplary of the invention and are not to be considered as limiting the present invention. Additions, omissions, substitutions, and other modifications can be made without departing from the scope of the present invention.

For example, in the third embodiment described above, two upper and lower beads 2111, 2112 were formed on the bead part 2102 included in the damping material fixing panel 2026. However, the present invention is not limited by this configuration. Three or more upper and lower beads may be formed on the bead part 2102. On the other hand, only one bead may be formed as well.

In addition, according to the above embodiment, an instance was described in which metallic welding of various components was made by spot-welding. However, the present invention is not limited to this embodiment. A known metallic welding method such as arc welding like TIG (Tungsten Inert Gas) welding, MIG (Metallic Inert Gas) welding, and plasma welding; laser welding; and electron beam welding may be used as well, as appropriate.

Moreover, in the embodiment described above, a bent section 2027 is formed at an upper rim of the longitudinal wall 2011 of the dashboard lower section 2010. The bent section 2027 bends and extends towards a rear direction. However, as long as the bent section 2027 bends and extends in the front-rear direction, the bent section 2027 may be configured to bend and extend from the upper rim of the longitudinal wall 2011 towards a frontal direction.

The invention claimed is:

1. A frontal structure of a vehicle comprising:
   a dashboard lower section comprising a board curved part formed so as to be curved; and
   a damping panel welded at a vehicle chamber side of a position corresponding to the board curved part of the dashboard lower section, wherein
   a bead extending along an upper-lower direction is formed on the damping panel; and
   the bead is curved more gradually compared to the board curved part.

2. A frontal structure of a vehicle according to claim 1, wherein the dashboard lower section comprises a bent part at a portion above the board curved part, the bent part bending and extending along a front-rear direction; and an upper end of the bead reaches the bent part.

3. A frontal structure of a vehicle according to claim 1, wherein the damping panel comprises an installment surface;

the installment surface comprises an opening part for installing a piping to install an air conditioning piping, the installment surface protruding towards the dashboard lower section; and the bead is formed toward a side of the opening part for installing a piping, in a left-right direction.

4. A frontal structure of a vehicle according to claim 1, wherein the dashboard lower section and a front side frame are welded below the bead.

5. A frontal structure of a vehicle according to claim 1, wherein the bead comprises a curved bead and a perpendicular bead;

the curved bead is formed above the perpendicular bead at a position corresponding to the board curved part;

the perpendicular bead is formed below the curved bead and extends along an upper-lower direction; and the curved bead is continuously connected with the perpendicular bead.

6. A frontal structure of a vehicle according to claim 1 further comprising:

an air conditioning boot; and a dashboard bead, wherein the dashboard lower section comprises a bent part and a boot attachment surface to attach the air conditioning boot;

the boot attachment surface protrudes towards an interior of a vehicle chamber and comprises an opening part through which an air conditioning piping is inserted and penetrated;

the air conditioning boot seals the opening part;

the bent part is formed at an upper rim of the dashboard lower section, bends and extends along a front-rear direction, and comprises a bent bead;

the dashboard bead is formed from an upper end of the boot attachment surface towards the bent part; and a ridge line of the bent bead is connected with a ridge line of the dashboard bead.

7. A frontal structure of a vehicle according to claim 6, wherein the dashboard lower section is welded to a reinforcing plate below the boot attachment surface; and the damping panel is sandwiched between the dashboard lower section and the reinforcing plate.

8. A frontal structure of a vehicle according to claim 6, wherein the dashboard bead comprises a plurality of steps in a left-right direction and protrudes towards a central portion in the left-right direction due to the plurality of steps.

9. A frontal structure of a vehicle according to claim 6, wherein the dashboard lower section comprises a center frame extending along an upper-lower direction; and the opening part is formed between the center frame and a reinforcing plate.

10. A frontal structure of a vehicle according to claim 6, wherein a number of the bent bead that is formed is larger than a number of the dashboard bead that is formed.

11. A frontal structure of a vehicle according to claim 1 further comprising:

a reinforcing plate, wherein the damping panel is sandwiched between the reinforcing plate and the dashboard lower section;

the damping panel is welded to the dashboard lower section;

the reinforcing plate comprises a setting hole, an existence nonexistence determination hole, and a slippage determination hole;

the damping panel is set to a predetermined position according to the setting hole;

whether or not the damping panel exists between the reinforcing plate and the dashboard lower section is determined according to the existence nonexistence determination hole;

whether or not the damping panel is placed at the predetermined position is determined according to the slippage determination hole; and the existence nonexistence determination hole is placed near the slippage determination hole.

12. A frontal structure of a vehicle according to claim 11, wherein the damping panel comprises a panel hole;

the panel hole is formed at a position corresponding to the slippage determination hole; and a radius of the panel hole is approximately equal to a radius of the slippage determination hole.

13. A frontal structure of a vehicle according to claim 11 further comprising:

a bead, wherein the bead extends in an upper-lower direction, is formed toward a side of the existence nonexistence determination hole and the slippage determination hole in a left-right direction, and comprises a bead curved part; and the bead curved part is curved more gradually compared to a shape of the board curved part of the dashboard lower section.

14. A frontal structure of a vehicle according to claim 11 further comprising:

a bent part formed at an upper rim of the dashboard lower section, wherein the bent part is bent and extended along a front-rear direction; and an upper end of the bead extends to a tip of the bent part.

15. A frontal structure of a vehicle according to claim 11 further comprising:

an installment surface on the damping panel, wherein the installment surface protrudes towards the dashboard lower section, and comprises an opening part for installing a piping to install an air conditioning piping; and the bead is formed toward a side of the opening part for installing a piping, in a left-right direction.

* * * * *